US008960537B2

(12) United States Patent
Bulawa et al.

(10) Patent No.: US 8,960,537 B2
(45) Date of Patent: *Feb. 24, 2015

(54) MONEY TRANSFER SYSTEMS AND METHODS

(71) Applicant: The Western Union Company, Englewood, CO (US)

(72) Inventors: Kurt Bulawa, Parker, CO (US); Corey Allen Bohler, Castle Rock, CO (US); Dean A. Seifert, Parker, CO (US); Thomas B. Sayor, Castle Rock, CO (US); Mark Baumgart, Larkspur, CO (US); Erik S. Crawford, Parker, CO (US)

(73) Assignee: The Western Union Company, Englewood, CO (US)

( * ) Notice: Subject to any disclaimer, the term of this patent is extended or adjusted under 35 U.S.C. 154(b) by 102 days.

This patent is subject to a terminal disclaimer.

(21) Appl. No.: 13/683,693

(22) Filed: Nov. 21, 2012

(65) Prior Publication Data

US 2013/0124350 A1    May 16, 2013

Related U.S. Application Data

(63) Continuation of application No. 13/416,826, filed on Mar. 9, 2012, now Pat. No. 8,336,768, which is a continuation of application No. 12/638,917, filed on Dec. 15, 2009, now Pat. No. 8,152,054, which is a
(Continued)

(51) Int. Cl.
*G06Q 40/00* (2012.01)
*G06Q 20/10* (2012.01)
(Continued)

(52) U.S. Cl.
CPC .............. *G06Q 20/10* (2013.01); *G06Q 20/102* (2013.01); *G06Q 20/342* (2013.01); *G06Q 20/40* (2013.01); *G06Q 30/04* (2013.01); *G06Q 30/06* (2013.01); *G06Q 40/02* (2013.01); *G07F 7/025* (2013.01)
USPC ................................ 235/379; 705/39; 705/44

(58) Field of Classification Search
USPC .................................. 235/379, 380; 705/39, 44
See application file for complete search history.

(56) References Cited

U.S. PATENT DOCUMENTS 3,599,151 A    8/1971    Harr
3,783,755 A    1/1974    Lagin
(Continued)

FOREIGN PATENT DOCUMENTS

EP    481135 A1    4/1992
EP    949596 A2    10/1999
(Continued)

OTHER PUBLICATIONS

Author Unknown, "More Consumers Pay Bill as Convenience Stores in Japan," Asia Pulse, Tokyo, Aug. 29, 1997, 1 page.
(Continued)

*Primary Examiner* — Daniel Hess
(74) *Attorney, Agent, or Firm* — Kilpatrick Townsend & Stockton LLP

(57) ABSTRACT

The present invention provides systems and methods of facilitating money transfers. The method includes receiving, at a money transfer system, access to a customer's account, establishing, at the money transfer system, a money transfer record including a recipient and an amount, and receiving, at the money transfer system, an identifier for the money transfer record. The method further includes receiving presentation of the identifier at an input device of the money transfer system and authorizing a money transfer associated with the money transfer record.

25 Claims, 6 Drawing Sheets

Related U.S. Application Data continuation-in-part of application No. 11/132,710, filed on May 18, 2005, now Pat. No. 7,641,109, and a continuation-in-part of application No. 10/969,767, filed on Oct. 19, 2004.

(51) Int. Cl.
*G06Q 20/34* (2012.01)
*G06Q 20/40* (2012.01)
*G06Q 30/04* (2012.01)
*G06Q 30/06* (2012.01)
*G06Q 40/02* (2012.01)
*G07F 7/02* (2006.01)

(56) References Cited

U.S. PATENT DOCUMENTS

| | | |
|---|---|---|
| 3,833,395 A | 9/1974 | Gosnell |
| 4,032,931 A | 6/1977 | Haker |
| 4,321,672 A | 3/1982 | Braun et al. |
| 4,385,285 A | 5/1983 | Horst et al. |
| 4,454,414 A | 6/1984 | Benton |
| 4,562,340 A | 12/1985 | Tateisi et al. |
| 4,562,341 A | 12/1985 | Ohmae et al. |
| 4,630,200 A | 12/1986 | Ohmae et al. |
| 4,678,895 A | 7/1987 | Tateisi et al. |
| 4,722,554 A | 2/1988 | Pettit |
| 4,795,892 A | 1/1989 | Gilmore et al. |
| 4,812,628 A | 3/1989 | Boston et al. |
| 4,823,264 A | 4/1989 | Deming |
| 4,829,168 A | 5/1989 | Nakahara |
| 4,902,881 A | 2/1990 | Janku |
| 4,961,142 A | 10/1990 | Elliott et al. |
| 4,972,318 A | 11/1990 | Brown et al. |
| 5,021,967 A | 6/1991 | Smith |
| 5,053,607 A | 10/1991 | Carlson et al. |
| 5,119,293 A | 6/1992 | Hammond |
| 5,175,682 A | 12/1992 | Higashiyama et al. |
| 5,220,501 A | 6/1993 | Lawlor et al. |
| 5,233,167 A | 8/1993 | Markman et al. |
| 5,283,829 A | 2/1994 | Anderson |
| 5,350,906 A | 9/1994 | Brody et al. |
| 5,367,452 A | 11/1994 | Gallery et al. |
| 5,408,077 A | 4/1995 | Campo et al. |
| 5,426,594 A | 6/1995 | Wright et al. |
| 5,448,043 A | 9/1995 | Nakano et al. |
| 5,461,217 A | 10/1995 | Claus |
| 5,464,971 A | 11/1995 | Sutcliffe et al. |
| 5,465,206 A | 11/1995 | Hilt et al. |
| 5,477,037 A | 12/1995 | Berger |
| 5,477,038 A | 12/1995 | Levine et al. |
| 5,484,988 A | 1/1996 | Hills et al. |
| 5,491,325 A | 2/1996 | Huang et al. |
| 5,504,677 A | 4/1996 | Pollin |
| 5,510,979 A | 4/1996 | Moderi et al. |
| 5,513,117 A | 4/1996 | Small |
| 5,524,073 A | 6/1996 | Stambler |
| 5,546,523 A | 8/1996 | Gatto |
| 5,550,734 A | 8/1996 | Tarter et al. |
| 5,555,496 A | 9/1996 | Tackbary et al. |
| 5,557,516 A | 9/1996 | Hogan |
| 5,570,465 A | 10/1996 | Tsakanikas |
| 5,577,109 A | 11/1996 | Stimson et al. |
| 5,604,802 A | 2/1997 | Holloway |
| 5,616,902 A | 4/1997 | Cooley et al. |
| 5,622,388 A | 4/1997 | Alcordo |
| 5,629,982 A | 5/1997 | Micali |
| 5,638,283 A | 6/1997 | Herbert |
| 5,649,117 A | 7/1997 | Landry |
| 5,650,604 A | 7/1997 | Marcous et al. |
| 5,657,201 A | 8/1997 | Kochis |
| 5,677,955 A | 10/1997 | Doggett et al. |
| 5,679,940 A | 10/1997 | Templeton et al. |
| 5,686,713 A | 11/1997 | Rivera |
| 5,699,528 A | 12/1997 | Hogan |
| 5,717,868 A | 2/1998 | James |
| 5,721,768 A | 2/1998 | Stimson et al. |
| 5,732,136 A | 3/1998 | Murphree et al. |
| 5,732,400 A | 3/1998 | Mandler et al. |
| 5,745,886 A | 4/1998 | Rosen |
| 5,757,917 A | 5/1998 | Rose et al. |
| 5,764,888 A | 6/1998 | Bolan et al. |
| 5,774,879 A | 6/1998 | Custy et al. |
| 5,777,305 A | 7/1998 | Smith et al. |
| 5,778,067 A | 7/1998 | Jones et al. |
| 5,779,379 A | 7/1998 | Mason et al. |
| 5,783,808 A | 7/1998 | Josephson |
| 5,787,403 A | 7/1998 | Randle |
| 5,794,207 A | 8/1998 | Walker et al. |
| 5,799,072 A | 8/1998 | Vulcan et al. |
| 5,806,045 A | 9/1998 | Biorge et al. |
| 5,815,657 A | 9/1998 | Williams et al. |
| 5,825,617 A | 10/1998 | Kochis et al. |
| 5,826,241 A | 10/1998 | Stein et al. |
| 5,828,875 A | 10/1998 | Halvarsson et al. |
| 5,832,457 A | 11/1998 | O'Brien et al. |
| 5,832,463 A | 11/1998 | Funk |
| 5,859,419 A | 1/1999 | Wynn |
| 5,865,470 A | 2/1999 | Thompson |
| 5,868,236 A | 2/1999 | Rademacher |
| 5,870,718 A | 2/1999 | Spector |
| 5,875,435 A | 2/1999 | Brown |
| 5,878,211 A | 3/1999 | Delagrange et al. |
| 5,880,446 A | 3/1999 | Mori et al. |
| 5,893,080 A | 4/1999 | McGurl et al. |
| 5,896,298 A | 4/1999 | Richter |
| 5,897,625 A | 4/1999 | Gustin et al. |
| 5,897,989 A | 4/1999 | Beecham |
| 5,898,154 A | 4/1999 | Rosen |
| 5,899,980 A | 5/1999 | Wilf et al. |
| 5,899,982 A | 5/1999 | Randle |
| 5,902,983 A | 5/1999 | Crevelt et al. |
| 5,903,633 A | 5/1999 | Lorsch |
| 5,903,880 A | 5/1999 | Biffar |
| 5,903,881 A | 5/1999 | Schrader et al. |
| 5,909,492 A | 6/1999 | Payne et al. |
| 5,909,673 A | 6/1999 | Gregory |
| 5,910,988 A | 6/1999 | Ballard |
| 5,913,202 A | 6/1999 | Motoyama |
| 5,915,023 A | 6/1999 | Bernstein |
| 5,920,629 A | 7/1999 | Rosen |
| 5,920,847 A | 7/1999 | Kolling et al. |
| 5,920,848 A | 7/1999 | Schutzer et al. |
| 5,923,016 A | 7/1999 | Fredregill et al. |
| 5,937,396 A | 8/1999 | Konya |
| 5,949,044 A | 9/1999 | Walker et al. |
| 5,952,639 A | 9/1999 | Ohki et al. |
| 5,953,709 A | 9/1999 | Gilbert et al. |
| 5,953,710 A | 9/1999 | Fleming |
| 5,960,412 A | 9/1999 | Tackbary et al. |
| 5,963,647 A | 10/1999 | Downing et al. |
| 5,974,146 A | 10/1999 | Randle et al. |
| 5,974,194 A | 10/1999 | Hirani et al. |
| RE36,365 E | 11/1999 | Levine et al. |
| 5,978,780 A | 11/1999 | Watson |
| 5,987,426 A | 11/1999 | Goodwin |
| 5,991,748 A | 11/1999 | Taskett |
| 5,993,047 A | 11/1999 | Novogrod et al. |
| 5,999,624 A | 12/1999 | Hopkins |
| 6,003,763 A | 12/1999 | Gallagher et al. |
| 6,011,833 A | 1/2000 | West |
| 6,012,048 A | 1/2000 | Gustin et al. |
| 6,015,087 A | 1/2000 | Seifert et al. |
| 6,018,724 A | 1/2000 | Arent |
| 6,027,216 A | 2/2000 | Guyton et al. |
| 6,029,150 A | 2/2000 | Kravitz |
| 6,030,000 A | 2/2000 | Diamond |
| 6,032,133 A | 2/2000 | Hilt et al. |
| 6,032,136 A | 2/2000 | Brake, Jr. et al. |
| 6,032,137 A | 2/2000 | Ballard |
| 6,035,285 A | 3/2000 | Schlect et al. |
| 6,035,406 A | 3/2000 | Moussa et al. |
| 6,039,245 A | 3/2000 | Symonds et al. |
| 6,039,250 A | 3/2000 | Ito et al. |

(56) References Cited

U.S. PATENT DOCUMENTS

| | | |
|---|---|---|
| 6,044,360 A | 3/2000 | Picciallo |
| 6,044,362 A | 3/2000 | Neely |
| 6,045,039 A | 4/2000 | Stinson et al. |
| 6,047,268 A | 4/2000 | Bartoli et al. |
| 6,052,674 A | 4/2000 | Zervides et al. |
| 6,058,417 A | 5/2000 | Hess et al. |
| 6,061,799 A | 5/2000 | Eldridge et al. |
| 6,064,990 A | 5/2000 | Goldsmith |
| 6,070,150 A | 5/2000 | Remington et al. |
| 6,070,156 A | 5/2000 | Hartsell, Jr. |
| 6,070,798 A | 6/2000 | Nethery |
| 6,073,121 A | 6/2000 | Ramzy |
| 6,078,907 A | 6/2000 | Lamm |
| 6,081,790 A | 6/2000 | Rosen |
| 6,088,683 A | 7/2000 | Jalili |
| 6,088,684 A | 7/2000 | Custy et al. |
| 6,097,834 A | 8/2000 | Krouse et al. |
| 6,098,053 A | 8/2000 | Slater |
| 6,104,815 A | 8/2000 | Alcorn et al. |
| 6,106,020 A | 8/2000 | Leef et al. |
| 6,119,106 A | 9/2000 | Mersky et al. |
| 6,119,931 A | 9/2000 | Novogrod |
| 6,119,933 A | 9/2000 | Wong et al. |
| 6,122,625 A | 9/2000 | Rosen |
| 6,128,602 A | 10/2000 | Northington et al. |
| 6,128,603 A | 10/2000 | Dent et al. |
| 6,129,275 A | 10/2000 | Urquhart et al. |
| 6,134,561 A | 10/2000 | Brandien et al. |
| 6,145,738 A | 11/2000 | Stinson et al. |
| 6,148,377 A | 11/2000 | Carter et al. |
| 6,149,056 A | 11/2000 | Stinson et al. |
| 6,164,528 A | 12/2000 | Hills et al. |
| 6,167,386 A | 12/2000 | Brown |
| 6,175,823 B1 | 1/2001 | Van Dusen |
| 6,178,409 B1 | 1/2001 | Weber et al. |
| 6,189,787 B1 | 2/2001 | Dorf |
| 6,193,152 B1 | 2/2001 | Fernando et al. |
| 6,193,155 B1 | 2/2001 | Walker et al. |
| 6,199,761 B1 | 3/2001 | Drexler |
| 6,202,054 B1 | 3/2001 | Lawlor et al. |
| 6,206,283 B1 | 3/2001 | Bansal et al. |
| RE37,122 E | 4/2001 | Levine et al. |
| 6,216,277 B1 | 4/2001 | Cheng |
| 6,223,166 B1 | 4/2001 | Kay |
| 6,223,168 B1 | 4/2001 | McGurl et al. |
| 6,246,996 B1 | 6/2001 | Stein et al. |
| 6,247,047 B1 | 6/2001 | Wolff |
| 6,260,024 B1 | 7/2001 | Shkedy |
| 6,263,446 B1 | 7/2001 | Kausik et al. |
| 6,269,369 B1 | 7/2001 | Robertson |
| 6,275,829 B1 | 8/2001 | Angiulo et al. |
| 6,282,522 B1 | 8/2001 | Davis et al. |
| 6,286,756 B1 | 9/2001 | Stinson et al. |
| 6,289,322 B1 | 9/2001 | Kitchen et al. |
| 6,292,789 B1 | 9/2001 | Schutzer |
| 6,304,860 B1 | 10/2001 | Martin, Jr. et al. |
| 6,305,604 B1 | 10/2001 | Ono |
| 6,308,887 B1 | 10/2001 | Korman et al. |
| 6,314,169 B1 | 11/2001 | Schelberg, Jr. et al. |
| 6,317,745 B1 | 11/2001 | Thomas et al. |
| 6,321,211 B1 | 11/2001 | Dodd |
| 6,321,984 B1 | 11/2001 | McCall et al. |
| 6,321,987 B1 | 11/2001 | Watanabe et al. |
| 6,327,348 B1 | 12/2001 | Walker et al. |
| 6,327,570 B1 | 12/2001 | Stevens |
| 6,327,575 B1 | 12/2001 | Katz |
| 6,334,108 B1 | 12/2001 | Deaton et al. |
| 6,343,279 B1 | 1/2002 | Bissonette et al. |
| 6,347,305 B1 | 2/2002 | Watkins |
| 6,360,254 B1 | 3/2002 | Linden et al. |
| 6,367,693 B1 | 4/2002 | Novogrod |
| 6,370,240 B1 | 4/2002 | Woynoski et al. |
| 6,381,582 B1 | 4/2002 | Walker et al. |
| 6,386,444 B1 | 5/2002 | Sullivan |
| 6,394,343 B1 | 5/2002 | Berg et al. |
| 6,408,284 B1 | 6/2002 | Hilt et al. |
| 6,411,942 B1 | 6/2002 | Jujimoto |
| 6,415,271 B1 | 7/2002 | Turk et al. |
| 6,438,586 B1 | 8/2002 | Hass et al. |
| 6,449,599 B1 | 9/2002 | Payne et al. |
| 6,453,300 B2 | 9/2002 | Simpson |
| 6,473,500 B1 | 10/2002 | Risafi et al. |
| 6,484,936 B1 | 11/2002 | Nicoll et al. |
| 6,488,203 B1 | 12/2002 | Stoutenburg et al. |
| 6,502,745 B1 | 1/2003 | Stimson et al. |
| 6,502,747 B1 | 1/2003 | Stoutenburg et al. |
| 6,510,453 B1 | 1/2003 | Apfel et al. |
| 6,526,130 B1 | 2/2003 | Paschini |
| 6,539,363 B1 | 3/2003 | Allgeier et al. |
| 6,547,132 B1 | 4/2003 | Templeton et al. |
| 6,549,119 B1 | 4/2003 | Turner |
| 6,554,184 B1 | 4/2003 | Amos |
| 6,575,358 B2 | 6/2003 | O'Callaghan et al. |
| 6,601,038 B1 | 7/2003 | Kolls |
| 6,609,113 B1 | 8/2003 | O'Leary et al. |
| RE38,255 E | 9/2003 | Levine et al. |
| 6,618,705 B1 | 9/2003 | Wang et al. |
| 6,736,314 B2 | 5/2004 | Cooper et al. |
| 6,738,749 B1 | 5/2004 | Chasko |
| 6,761,309 B2 | 7/2004 | Stoutenburg et al. |
| 6,761,311 B1 | 7/2004 | Algiene et al. |
| 6,805,289 B2 | 10/2004 | Noriega et al. |
| 6,814,282 B2 | 11/2004 | Seifert et al. |
| 6,827,260 B2 | 12/2004 | Stoutenburg et al. |
| 6,829,588 B1 | 12/2004 | Stoutenburg et al. |
| 6,847,947 B1 | 1/2005 | Kambour et al. |
| 6,854,651 B2 | 2/2005 | Smith et al. |
| 6,886,741 B1 | 5/2005 | Salveson |
| 6,886,742 B2 | 5/2005 | Stoutenburg et al. |
| 6,908,031 B2 | 6/2005 | Seifert et al. |
| 6,922,673 B2 | 7/2005 | Karas et al. |
| 6,938,013 B1 | 8/2005 | Gutierrez-Sheris |
| 7,092,916 B2 | 8/2006 | Diveley et al. |
| 7,103,577 B2 | 9/2006 | Blair et al. |
| 7,104,440 B2 | 9/2006 | Hansen et al. |
| 7,107,249 B2 | 9/2006 | Dively et al. |
| 7,158,955 B2 | 1/2007 | Diveley et al. |
| 7,182,252 B1 | 2/2007 | Cooper et al. |
| 7,195,151 B2 | 3/2007 | Licciardello et al. |
| 7,398,252 B2 | 7/2008 | Neofytides et al. |
| 7,469,224 B2 | 12/2008 | Foss, Jr. |
| 7,641,109 B2 * | 1/2010 | Seifert et al. ............... 235/380 |
| 7,912,786 B2 | 3/2011 | Battaglini |
| 8,152,054 B2 * | 4/2012 | Bulawa et al. ............ 235/379 |
| 8,336,768 B2 * | 12/2012 | Bulawa et al. ............ 235/379 |
| 2001/0032878 A1 | 10/2001 | Tsiounis et al. |
| 2001/0051876 A1 | 12/2001 | Seigel et al. |
| 2001/0054003 A1 | 12/2001 | Chien et al. |
| 2002/0007320 A1 | 1/2002 | Hogan et al. |
| 2002/0016769 A1 | 2/2002 | Barbara et al. |
| 2002/0023055 A1 | 2/2002 | Antognini et al. |
| 2002/0032653 A1 | 3/2002 | Schutzer |
| 2002/0046106 A1 | 4/2002 | Ishibashi et al. |
| 2002/0046116 A1 | 4/2002 | Hohle et al. |
| 2002/0055911 A1 | 5/2002 | Guerreri |
| 2002/0062285 A1 | 5/2002 | Amann et al. |
| 2002/0076018 A1 | 6/2002 | Banks et al. |
| 2002/0077976 A1 | 6/2002 | Meyer et al. |
| 2002/0082931 A1 | 6/2002 | Siegel et al. |
| 2002/0087337 A1 | 7/2002 | Hensley |
| 2002/0087462 A1 | 7/2002 | Seifert et al. |
| 2002/0087463 A1 | 7/2002 | Fitzgerald et al. |
| 2002/0087467 A1 | 7/2002 | Mascavage et al. |
| 2002/0087469 A1 | 7/2002 | Ganesan et al. |
| 2002/0104026 A1 | 8/2002 | Barra et al. |
| 2002/0104878 A1 | 8/2002 | Seifert et al. |
| 2002/0111908 A1 | 8/2002 | Milberger et al. |
| 2002/0143566 A1 | 10/2002 | Diveley |
| 2002/0143706 A1 | 10/2002 | Diveley |
| 2002/0143709 A1 | 10/2002 | Diveley |
| 2002/0152168 A1 | 10/2002 | Neofytides et al. |
| 2002/0152176 A1 | 10/2002 | Neofytides et al. |
| 2002/0153414 A1 | 10/2002 | Stoutenburg et al. |
| 2002/0161702 A1 | 10/2002 | Milberger et al. |

(56) References Cited

U.S. PATENT DOCUMENTS

| | | |
|---|---|---|
| 2002/0169719 A1 | 11/2002 | Dively et al. |
| 2002/0174016 A1 | 11/2002 | Cuervo |
| 2002/0195486 A1 | 12/2002 | Erb et al. |
| 2003/0001005 A1 | 1/2003 | Risafi et al. |
| 2003/0014371 A1 | 1/2003 | Turgeon |
| 2003/0024979 A1 | 2/2003 | Hansen et al. |
| 2003/0028491 A1 | 2/2003 | Cooper |
| 2003/0053609 A1 | 3/2003 | Risafi et al. |
| 2003/0055689 A1 | 3/2003 | Block et al. |
| 2003/0055780 A1 | 3/2003 | Hansen et al. |
| 2003/0061171 A1 | 3/2003 | Gilbert et al. |
| 2003/0069856 A1 | 4/2003 | Seifert et al. |
| 2003/0111529 A1 | 6/2003 | Templeton et al. |
| 2003/0120777 A1 | 6/2003 | Thompson et al. |
| 2003/0126036 A1 | 7/2003 | Mascavage et al. |
| 2003/0126075 A1 | 7/2003 | Mascavage et al. |
| 2003/0126083 A1 | 7/2003 | Seifert et al. |
| 2003/0130907 A1 | 7/2003 | Karas et al. |
| 2003/0130940 A1 | 7/2003 | Hansen et al. |
| 2003/0130948 A1 | 7/2003 | Algiene et al. |
| 2003/0135459 A1 | 7/2003 | Abelman et al. |
| 2003/0149662 A1 | 8/2003 | Shore |
| 2003/0154164 A1 | 8/2003 | Mascavage et al. |
| 2003/0167237 A1 | 9/2003 | Degen et al. |
| 2003/0177067 A1 | 9/2003 | Cowell et al. |
| 2003/0187789 A1 | 10/2003 | Karas et al. |
| 2003/0187791 A1 | 10/2003 | Weichert et al. |
| 2003/0187792 A1 | 10/2003 | Hansen et al. |
| 2003/0191709 A1 | 10/2003 | Elston et al. |
| 2003/0195811 A1 | 10/2003 | Hayes et al. |
| 2003/0208445 A1 | 11/2003 | Compiano |
| 2003/0217005 A1 | 11/2003 | Drummond et al. |
| 2003/0222135 A1 | 12/2003 | Stoutenburg et al. |
| 2003/0222136 A1 | 12/2003 | Bolle et al. |
| 2003/0225689 A1 | 12/2003 | MacFarlane et al. |
| 2004/0007618 A1 | 1/2004 | Oram et al. |
| 2004/0015438 A1 | 1/2004 | Compiano et al. |
| 2004/0024701 A1 | 2/2004 | Hansen et al. |
| 2004/0059672 A1 | 3/2004 | Baig et al. |
| 2004/0068437 A1 | 4/2004 | McGee et al. |
| 2004/0078327 A1 | 4/2004 | Frazier et al. |
| 2004/0083172 A1 | 4/2004 | Wiederin |
| 2004/0088248 A1 | 5/2004 | Cutler |
| 2004/0088261 A1 | 5/2004 | Moore et al. |
| 2004/0098328 A1 | 5/2004 | Grant et al. |
| 2004/0098335 A1 | 5/2004 | Michelsen et al. |
| 2004/0107165 A1 | 6/2004 | Blair et al. |
| 2004/0117302 A1 | 6/2004 | Weichert et al. |
| 2004/0138947 A1 | 7/2004 | McGee et al. |
| 2004/0139008 A1 | 7/2004 | Mascavage |
| 2004/0143552 A1 | 7/2004 | Weichert et al. |
| 2004/0148286 A1 | 7/2004 | Rogers |
| 2004/0153398 A1 | 8/2004 | Baumgartner et al. |
| 2004/0158521 A1 | 8/2004 | Newton et al. |
| 2004/0164145 A1 | 8/2004 | Licciardello et al. |
| 2004/0167860 A1 | 8/2004 | Baxter et al. |
| 2004/0193897 A1 | 9/2004 | Van Volkenburgh |
| 2004/0205023 A1 | 10/2004 | Hafer et al. |
| 2004/0210476 A1 | 10/2004 | Blair et al. |
| 2004/0210506 A1 | 10/2004 | Algiene et al. |
| 2004/0210521 A1 | 10/2004 | Crea et al. |
| 2004/0210523 A1 | 10/2004 | Gains et al. |
| 2004/0211831 A1 | 10/2004 | Stoutenburg et al. |
| 2004/0254833 A1 | 12/2004 | Algiene |
| 2005/0004702 A1 | 1/2005 | McDonald |
| 2005/0017067 A1 | 1/2005 | Seifert et al. |
| 2005/0080728 A1 | 4/2005 | Sobek |
| 2005/0107152 A1 | 5/2005 | McGee et al. |
| 2005/0121517 A1 | 6/2005 | Igval et al. |
| 2005/0137948 A1 | 6/2005 | Kissner et al. |
| 2005/0167481 A1 | 8/2005 | Hansen et al. |
| 2005/0177505 A1 | 8/2005 | Keeling et al. |
| 2005/0177716 A1 | 8/2005 | Ginter et al. |
| 2005/0180550 A1 | 8/2005 | McGee et al. |
| 2005/0187929 A1 | 8/2005 | Staggs |
| 2005/0209958 A1 | 9/2005 | Michelsen et al. |
| 2005/0209961 A1 | 9/2005 | Michelsen et al. |
| 2005/0251440 A1 | 11/2005 | Bednarek |
| 2006/0085335 A1 | 4/2006 | Crawford et al. |
| 2006/0144927 A1 | 7/2006 | Love et al. |
| 2006/0261150 A1 | 11/2006 | Seifert et al. |
| 2007/0063021 A1 | 3/2007 | Chakiris et al. |
| 2007/0187484 A1 | 8/2007 | Cooper et al. |
| 2010/0161485 A1 | 6/2010 | Bulawa et al. |
| 2012/0233069 A1 | 9/2012 | Bulawa et al. |

FOREIGN PATENT DOCUMENTS

| | | |
|---|---|---|
| EP | 1077436 A2 | 2/2001 |
| EP | 1607916 A1 | 12/2005 |
| WO | 00/22559 A1 | 4/2000 |
| WO | 00/46725 A1 | 8/2000 |
| WO | 00/67177 A2 | 11/2000 |
| WO | 01/04816 A1 | 1/2001 |
| WO | 02/05195 A1 | 1/2002 |

OTHER PUBLICATIONS

Author Unknown, "Verizon Wireless Customers Can Now Pay Bills at Verizon Plus Stores Nationwide," PR Newswire, Jan. 13, 2004, 2 pages.

International Search Report and Written Opinion of PCT/US05/36537 mailed on Jan. 17, 2007, 5 pages.

"About Western Union: Company History," www.payment-solutions.com/history.html, 2005, 2 pages.

American Airlines, "Purchasing American Airlines Tickets Just Got Easier," American Airlines Press Release, Sep. 20, 2005, 4 pages.

American Greeting Cards Click-Through, no date, 38 pages.

AmeriNet, Inc., "The Best Idea in Payment Systems since the Credit Card," www.debit-it.com, printed Feb. 7, 2000, 8 pages.

Andrejczak, M., "Va. Bank Aims to Gain Accounts Through Pact With Debit Card Issuer," American Banker, May 17, 1999, vol. 164, No. 93, 2 pages.

Author Unknown, "Collection by Money Transfer: MoneyGram Service Removes Time-Consuming Steps to Commercial Collections," Collector, Jul. 1990, 1 page.

Author Unknown, ". . . And a nine-second money order dispenser," Post-News (Somerset, England), 1991, vol. 17, No. 1, 1 page.

Author Unknown, "AeroMexico and Western Union partner to offer a cash payment option for booking airline tickets," AeroMexico Press Release, 2004, 2 pages.

Author Unknown, "American Express Introduces Automated Money Order Dispenser," Professional Check Casher, Dec. 1990/Jan. 1991, 1 page.

Author Unknown, "American Express Money Orders, Travelers Cheques Now on Sale," Dots and Dashes, Apr. 1936, vol. 12, No. 4, 2 pages.

Author Unknown, "American Express Unit Introduces State-Of-The-Art Automated Money Order Dispenser," Tri-State Food News, Dec. 1990, 1 page.

Author Unknown, "Amex Money Order Dispenser," The Nilson Report, Dec. 1990, 1 page.

Author Unknown, "Amex tests Moneygram," ADNEWS (Canada), Jul. 23, 1990, 1 page.

Author Unknown, "AT&T Wireless to Offer Western Union SwiftPay As Replenishment Option for AT&T Free2Go Wireless Prepaid Customers," PR Newswire Association, Oct. 8, 2001, 2 pages.

Author Unknown, "billserv.com Launches bills.com, an Internet Portal for Consumers to Pay All Bills Online at No Cost," Business Wire, Feb. 22, 2000, 2 pages, New York.

Author Unknown, "CES/NaBANCO Introduces Stored Value Card Technology: Blockbuster Video is First Merchant Partner," First Data Corp. Press Release, Jan. 15, 1996, 3 pages.

Author Unknown, "Dots and Dashes," Dots and Dashes, Sep. 1935, vol. 11, No. 9, 4 pages.

Author Unknown, "E-Commerce, Email, and E-greeting Cards Combine in New Web Site Designed by Interactive Bureau," Business Wire, Sep. 14, 1999, 2 pages.

(56) References Cited

OTHER PUBLICATIONS

Author Unknown, "Get Your Collect Card," Dots and Dashes, Jan.-Feb. 1939, No. 1, 2 pages.
Author Unknown, "GiftSpot.com Simplifies Gift-Giving on the Internet," PR Newswire, Oct. 20, 1999, retrieved from PROQUEST database on May 1, 2002, 5 pages.
Author Unknown, "Last of the Pony Express Riders Tells His Story," Dots and Dashes, Oct. 1932, vol. 13, No. 10, 2 pages.
Author Unknown, "Messenger Work Full of Adventure, Excitement," Dots and Dashes, Nov. 1933, vol. 9, No. 11, 2 pages.
Author Unknown, "Money Order Reports Aid Mailgram," Western Union News Supplement, Dec. 1975. 2 pages.
Author Unknown, "Nation Receives Time Over Western Union Network," Dots and Dashes, May 1931, vol. 7, No. 5, 2 pages.
Author Unknown, "New Service Relies on a WU Network," Western Union News Supplement, 1975, 2 pages.
Author Unknown, "New Western Union SwiftPay Service Continues Expansion of Consumer-to-Business Payment Options," PR Newswire Association, Inc., Oct. 29, 1999, 2 pages.
Author Unknown, "PayPal for the Palm," HandheldNews.com, retrieved from www.handheldnews.com/file.asp?ObjectID=5401 on Oct. 10, 2003, 2 pages.
Author Unknown, "PayPal.com Case Study," retrieved from http://fox.rollins.edu/~slackman/PayPal.htm on Sep. 23, 2003, 7 pages.
Author Unknown, "PaySys signs up four Asian distributors," Orlando Business Journal, Feb. 19, 1997, 3 pages.
Author Unknown, "Picture of Bill Payment Form or Advertisment," no date, 1 page.
Author Unknown, "Pilgrims Started Thanksgiving Custom," Dots and Dashes, Nov. 1928, vol. 4, No. 11, 2 pages.
Author Unknown, "Quarterly Report, 1st Quarter of the Western Union Telegraph Company," Spring 1978, 2 pages.
Author Unknown, "Quick Cash and Quick Collect: Western Union's money-movers," Newsbriefs, Spring 1990, vol. 2, No. 1, 3 pages.
Author Unknown, "Refund of Money Transfers," Journal of the Telegraph, 1913, vol. 45, 2 pages.
Author Unknown, "Reynolds Arcade Was Western Union Birthplace," Dots and Dashes, Aug. 1933, vol. 9, No. 8, 2 pages.
Author Unknown, "Sending Cash in a Flash," Travel & Leisure, Sep. 1990, pp. 42.
Author Unknown, "The Three Wise Men of Western Union," Fortune, Nov. 1935, 3 pages.
Author Unknown, "Western Union Creates Phone Card Pact With BLT Technologies," PR Newswire Association, Inc., Jan. 22, 1997, 2 pages.
Author Unknown, "Western Union Financial Services Forms Joint Venture to Enter Check Cashing Business," PR Newswire Association, Inc., Aug. 22, 1991, 1 page.
Author Unknown, "Western Union Money Orders More Popular Than Ever," Dots and Dashes, 1942, vol. 18. No. 3, 2 pages.
Author Unknown, "Western Union Quick Collect," 2004, 2 pages.
Author Unknown, "Western Union SwiftPay Selected by Sheakley Uniservice to Complete W-2 Reprint Transactions," PR Newswire, Jun. 6, 2000, 2 pages.
Barras, S., "Staff Letters and Memoranda," State of New York Banking Department, Jul. 18, 2000, retrieved from www.banking.state.ny.us/lo000718.htm on Sep. 23, 2003, 2 pages.
Boneh, D., "Beaming Money by Email is Web's Next Killer App," PR Newswire, Nov. 16, 1999, 4 pages, New York.
CandyGram, "Form 1208 (5B)," no date, 1 page.
Confinity, inc., "PayPal—How PayPal.com Works," 2000, retrieved from www.paypal.com/cgi-bin/webscr?cmd=paypal-works on Feb. 7, 2000, 7 pages.
Connect, Inc., "Leading Provider of Transaction Car Processing Selects Connect OneServer Software As a Solution for Advanced Internet Merchant Services," Connect, Inc. Press Release, May 17, 1996, 4 pages.
dotBANK, "The way to send and receive money on the internet," retrieved from www.dotbank.com on Feb. 7, 2000, 6 pages.
Electronic Licensing and Security Initiative, "Stream, LitleNet, BBN, and KPMG Announce Industry-Wide Initiative to Enable Wide-Scale Software Electronic Commerce," ELSI Press Release, May 7, 1996, 6 pages.
Epper Hoffman, K., "PayPal Still Running Free: But the e-payments company's carefee days may be numbered if regulators decide it's essentially a bank," Bank Technology News, published between 2001-2003, retrieved from www.banktechnews.com/btn/articles/btnoct01-13.shtml on Sep. 23, 2003, 3 pages.
European Patent Application No. 06815200.8, Supplementary Partial European Search Report, 6 pages, Nov. 10, 2009.
First Data Corp., "1998 Annual Report to Shareholders," 1998, 3 pages.
First Data Corp., "Annual Report 1999," 1999. 2 pages.
First Data Corp., "Behind the Scenes of Life: Annual Report 1996," 1996, 3 pages.
First Data Corp., "Common Values Uncommon Opportunities: 1995 Annual Report," 1995, 2 pages.
First Data Corp., "First Data Aligns with CyberCash to Offer New Electronic Coin Service," First Data Corp. Press Release, Sep. 30, 1996, 3 pages.
First Data Corp., "First Data and Netscape Announce Program to Help Businesses Establish Payment-Enabled Web Sites," First Data Corp. Press Release, Sep. 30, 1996, 5 pages.
First Data Corp., "First Data and Netscape Offering Internet Payment Processing Service," First Data Corp. Press Release, Feb. 20, 1996, 3 pages.
First Data Corp., "First Data InfoSource Offers Database Analysis With DecisionScope," First Data Corp. Press Release, Apr. 25, 1996, 2 pages.
First Data Corp., "Western Union Announces ATM Card Payout for Money Transfer Transactions," First Data Corp. Press Release, Oct. 22, 2001, 1 pages.
First Data Corp., "Western Union Quick Collect," 2001-2002, 2004, 2 pages.
First Data Resources, "FDR to Offer HNC Software's Real-Time Fraud Detection: New distribution Agreement to Benefit Card Banks," First Data Resources Press Release, Oct. 25, 1996, 3 pages.
First Virtual Holdings Inc., "First Data, First USA Paymentech, GE Capital Invest in First Virtual Holdings," First Virtual Holdings Inc. Press Release, Sep. 18, 1996, 3 pages.
govONE Solutions, "Rhode Island Becomes First State to Accept Child Support Payments at Western Union: Government Payment Leader govONE Solutions Adds Walk-in to Full Suite of Payment Options," govONE Solutions Press Release, Oct. 2002, 3 pages.
Greenia, M,, "Lexikon's History of Computing: Glossary Index," Lexikon Services, 1982, 2002-2003 retrieved from www.computermuseum.li/Testpage/01HISTORYCD-Glossary.htm on Nov. 10, 2005, 2 pages.
HNC Software Inc., "First Data to Offer Card Profitability Software From HNC," HNC Software Inc. Press Release, Mar. 6, 1996, 3 pages.
Idealab Co., "PayMe.com: getting money from friends and clients has never been easier!," retrieved from https://ssl.idealab.com on Feb. 16, 2000, 7 pages.
Intell-A-Check Corp., "Tell-A-Check: The Way to get Paid," 2000, retrieved from www.icheck.com on Feb. 7, 2000, 7 pages.
Latour, A., "PayPal Electronic Plan May Be on the Money in Years to Come," The Wall Street Journal Interactive Edition, Nov. 15, 1999, 2 pages.
Lawton, G., "Biometrics: A New Era in Security," Computer, Aug. 1998, 3 pages.
Levin, G., "Western Union not fading into sunset," Advertising Age, Apr. 27, 1992, 2 pages.
Luxury Brands, LLC, "Online Payment Services," retrieved from www.auctionbytes.com/cab/pages/payment on Sep. 30, 2003, 3 pages.
McEnaney, M., "Modular ATM Gives Boost to Diebold," Akron Beacon Journal, Jul. 12, 1997, 3 pages.
Memmelaar, E., "American Express in New Ad Drive," American Banker, Mar. 23, 1990, 1 page.
Memmelaar, E., "Western Union's Would-Be Rival," American Banker, Feb. 21, 1990, 1 page.

(56) References Cited

OTHER PUBLICATIONS

Moreau, D., "Sending Cash in a Flash: There are more ways to do it than you might think," Source Unknown, Jun. 1991, 2 pages.
Netscape Communications Corp., "Netscape Announces Netscape LivePayment to Facilitate Internet Commerce," Netscape Communications Corp. Press Release, May 13, 1996, 4 pages.
NetworkSolutions, "Whois Search Results: Who's record for bidpay.com," retrieved from www.networksolutions.corn/en_US/whois/results.jhtml;jsessionid=VZDZVYDD1J on Oct. 14, 2003, 2 pages.
NTS, Inc., "NTS Completes Merger With EDS Fleet Services," NTS, Inc. Press Release, Oct. 28, 1996, 3 pages.
PayPal, "News," retrieved from www.andrys.com/paypal.html on Sep. 23, 2003, 3 pages.
PayPal, "The way to send and receive money online," 2002, 4 pages.
PaySys, "PaySys—Company Overview," no date, 2 pages.
PaySys, "Products and Services from PaySys," no date, 2 pages.
PaySys, "VisionPLUS Consumer Payment Solution Overview," no date, 2 page.
Plotkin, H., "Beam Me up Some Cash," Silicon Valley Insider, Sep. 8, 1999, retrieved from www.halplotkin.com/cnbcs029.htm on Sep. 23, 2003, 3 pages.
SBC Communications, Inc., "SBC Communications Adds Western Union Locations for Walk-in Customer Bill Payments," SBC Communications, Inc. Press Release, Sep. 7, 2005, 2 pages.
Seifert, D., "Method for receiving electronically transferred funds using an automated teller machine: FDC 0167 PUS," no date, 21 pages.
Shultz, E., "Loved one stranded? Send cash," Akron Beacon Journal, Jul. 21, 1991, 2 pages.
Siler, C., "Amex aims expansion strategy at local currency exchanges," Crain's Chicago Business, Nov. 26, 1990, 1 page.
Steiner, I., "Accepting Credit Cards When You Sell Items: ProPay and Billpoint Payment Services," Auctionbytes Update, Jun. 18, 2000, No. 16, retrieved from www.auctionbytes.com/cab/abu/y200/m06/abu0016/s04 on Sep. 30, 2003, 4 pages.
Steiner, I., "BidPay.com Offers Click and Pay Service for buyers," Auctionbytes Update, Jan. 23, 2000, No. 6, retrieved from www.auctionbytes.com/cab/abu/y200/m01/abu0006/s04 on Sep. 23, 2003, 4 pages.
Steiner, I., "Follow-up to BidPay Article," Auctionbytes Update, Feb. 7, 2000, No. 7, retrieved from wwvv.auctionbytes.com/cab/abu/y200/m02/abu0007/s05 on Sep. 23, 2003, 3 pages.
Steiner, I., "PayPal Online Payment Service—Another Way to Pay for Auction Items," Auctionbytes Update, Feb. 20, 2000. No. 8, retrieved from www.auctionbytes.com/cab/abu/y200/m02/abu0008/s03 on Sep. 23, 2003, 4 pages.
Stockel, A., "Securing Data and Financial Transactions," Institute of Electrical and Electronics Engineers 29th Annual Conference, 1995, pp. 397-401.
Stoutenburg, E., et al., "Method and System for Performing Money Transfer Transactions (U.S. Appl. No. 10/289,802)," no date, 30 pages.
Teuke, M.R., "Nationwide Credit Collectors Act Globally," Professional Collector, Winter 2001, 3 pages.
TransPoint, "TransPoint—Common Questions." 2000, retrieved from www.transpoint.com on Feb. 10, 2000, 12 pages.
VeriFone Finance, Inc., "Fast, Low-Cost Transaction Automation at the Point of Service," 1998 & 1999, 3 pages.
VIPS Healthcare Information Solutions, "VIPS Introduces MCSource to Managed Healthcare Industry," VIPS Healthcare Information Solutions Press Release, Mar. 7, 1996, 2 pages.
Wermer, S., "A million credit card transactions in five hours," Primeur, Nov. 3, 1997, 2 pages.
Western Union BidPay, "Seller Frequently Asked Questions: Receiving Payments and Using the Service," 1999-2003, 7 pages.
Western Union Corp., "1981 Annual Report," 1981, 2 pages.
Western Union Corp., "1990 Annual Report to Shareholders and Annual Report on Form 10-K," 1990, 4 pages.
Western Union Corp., "Annual Report 1973: Information networks helping people," 1973, 5 pages.
Western Union Corp., "Annual Report 1974," 1974, 2 pages.
Western Union Corp., "Annual Report 1975: 125 years of pioneering in communications," 1975, 2 pages.
Western Union Corp., "Federal Benefits Checks Are Going Away Don't Let Your Customers Go With Them: Announcing the Western Union Benefits Quick Cash Program," 1998, 4 pages.
Western Union Corp., "First Quarter Report," Western Union Corp. Stockholder News & Annual Meeting Report, Spring 1978, 2 pages.
Western Union Corp., "Quarter 3: Stockholder News," Fall 1975, 3 pages.
Western Union Corp., "Western Union Products and Services," 1960. 22 pages.
Western Union Financial Service, Inc., "Benefits Quick Cash Agreement and Disclosure Statement," 1998, 2 pages.
Western Union Financial Services, Inc., "About Us," no date, retrieved from www.westernunion.com/info/aboutUSIndex.asp?country=global on Jun. 10, 2003, 9 pages.
Western Union Financial Services, Inc., "Cash Card Agreement and Disclosure Statement," 1998, 2 pages.
Western Union Financial Services, Inc., "Introducing the Western Union Cash Card Program," 1998, 2 pages.
Western Union Financial Services, Inc., "LAN Airline Alliance Carriers and Western Union Offer Travelers Additional Payment Options," Western Union Financial Services, Inc. Press Release, Apr. 20, 2005, 3 pages.
Western Union Financial Services, Inc., "State of Hawaii to Accept Child Support Payments at Western Union," Western Union Financial Services, Inc. Press Release, Mar. 22, 2004, 2 pages.
Western Union Financial Services, inc., "The Most Agents, The Most Locations, The Most Experienced," 2000, 2 pages.
Western Union Financial Services, Inc., "There's a lot to be said about the many advantages of the Quick Collect service. and look who's saying it," 14QC, 1995, 4 pages.
Western Union Financial Services, Inc., "Western Union and Continental Airlines Introduce New Quick and Easy Cash Payment Option When Booking Flights," Western Union Financial Services, Inc. Press Release, Jan. 5, 2004, 2 pages.
Western Union Financial Services, Inc., "Western Union Quick Collect: The fastest way to collect good funds," 1998, 11 pages.
Western Union Holdings, Inc., "Announcing . . . Quick Collect Online," Professional Collector, 2002, 3 pages.
Western Union Holdings, Inc., "Company Profile: The Western Union Convenience Pay Service," 2004, 4 pages.
Western Union Holdings, Inc., "Guess what? The check's not in the mail," Professional Collector, Winter 2001, 3 pages.
Western Union Holdings, Inc, "If you're not getting your payment with Quick Collect, chances are you're not getting it," 2000, 2 pages.
Western Union Holdings, Inc., "It takes a certain person to make a good collector: But it takes a good manager to make a champion," Professional Collector, Winter 2001, 3 pages.
Western Union Holdings, Inc., "MoneyZap.com Greeting Card Process Flow," Sep. 17, 2000, 2 pages.
Western Union Holdings, Inc., "Now, using our service is even more rewarding," 2004, 4 pages.
Western Union Holdings, Inc., "Only Western Union," no date, 2 pages.
Western Union Holdings, Inc., "Our Services," retrieved from www.westernunion.com/info/osComparePrePaid.asp on Nov. 3, 2005, 1 page.
Western Union Holdings, Inc., "Quick Cash: A safe and reliable way to send funds around the world," 2001, retrieved from www.payment-solutions.com/quickcash.html on Nov. 3, 2005, 1 page.
Western Union Holdings, Inc., "Quick Collect Sales Presentation," Jan. 2004, 28 pages.
Western Union Holdings, Inc., "Quick Collect Training Guide," Feb. 26, 2004, 8 pages.
Western Union Holdings, Inc., "Quick Collect Training Guide," Jan. 16, 2004, 10 pages.
Western Union Holdings, Inc., "Quick Pay: The convenient and reliable way to receive payments from customers worldwide," 2001, retrieved from www.payment-solutions.com/quickpay.htrnl on Nov. 3, 2005, 3 pages.

(56) References Cited

OTHER PUBLICATIONS

Western Union Holdings, Inc., "Rhode Island Becomes First State to Accept Child Support Payments at Western Union: More than 50 Western Union Convenience Pay Ageny Locations Offer New Level of Convenience to Rhode Island Residents Who Pay Child Support," Western Union Holdings, Inc. Press Release, Oct. 22, 2002, 3 pages.
Western Union Holdings, Inc., "Send Money by Credit Card," 2003, retrieved from www.moneytransfer.ie/creditcards.htm on Sep. 7, 2007, 1 page.
Western Union Holdings, Inc., "Send Receive Money," 2003, retrieved from www.moneytransfer.ie/SendReceive.htm on Sep. 7, 2007, 4 pages.
Western Union Holdings, Inc., "Send your payment using Western Union Quick Collect!," 2003, 2 pages.
Western Union Holdings, Inc., "Send Your Utility Bill Payment from Here!," 2004, 3 pages.
Western Union Holdings, Inc., "Signature Services: Helping financial Institutions send funds faster," 2001, retrieved from www.payment-soultions.com/signature.html on Nov. 3, 2005, 1 page.
Western Union Holdings. Inc., "Some Quick Facts about Quick Collect," no date, 1 page.
Western Union Holdings, Inc., "To send a Quick Collect payment: Sample Form," no date, 1 page.
Western Union Holdings, Inc., "VVestern Union Gift Greetings," no date, 6 pages.
Western Union Holdings, Inc., "Western Union Hotel-Motel Reservation Service," no date, 1 page.
Western Union Holdings, Inc., "Western Union Money Transfer Services: Send Money Online, Money Orders, Send Telegrams," retrieved from www.westernunion.com/info/osCompareMoneyMessage.asp on Nov. 3, 2005, 3 pages.
Western Union Holdings, Inc., "Western Union MoneyZap," 2000, retrieved from www.moneyzap.com/main.asp on Dec. 1, 2000, 23 pages.
Western Union Holdings, Inc., "Western Union Payment Services: Bidpay and Quick Collect, Online Bill Payment, Online Auction Payments," retrieved from www.westernunion.com/info/osComparePayment.asp on Nov. 3, 2005, 2 pages.
Western Union Holdings, Inc., "Western Union Quick Collect: 3 Easy Ways to Send a Payment: In Person, Online or by Phone!," 7QC, 2004, 2 pages.
Western Union Holdings, Inc., "When You're Helping a Customer Make a Crucial Payment, There's No Room for Guesswork," Professional Collector, Spring/Sumrner 2002, 3 pages.
Western Union Holdings, Inc., "Why Send Your Customers Across Town When You Can Send Them Next Door?," 2005, 1 page.
Western Union Holdings, Inc., "You're Sending More Than a Payment," 2004, 2 pages.
Western Union Telegraph Co., "94th Annual Report: 1949," 1949, 3 pages.
Western Union Telegraph Co., "Annual Report 1951," 1951, 2 pages.
Western Union Telegraph Co., "Annual Report 1953," 1953, 2 pages.
Western Union Telegraph Co., "Annual Report 1954," 1954, 3 pages.
Western Union Telegraph Co., "Annual Report of the President of the Western Union Telegraph Company to the Stockholders," 1873, pp. 8-11.
Western Union Telegraph Co:, "Annual Report of the President of the Western Union Telegraph Company to the Stockholders," 1874, pp. 8-11.
Western Union Telegraph Co., "Collect Your Delinquent Accounts by Telegraph (Form 1229-A)," 1933, 1 page.
Western Union Telegraph Co., "Delivery of Money Transfer Drafts," Delivery Department Instructions, Apr. 1926, 3 pages.
Western Union Telegraph Co., "Eightieth Annual Report of the Western Union Telegraph Company Incorporated for Fiscal Year 1935," 1935, 2 pages.
Western Union Telegraph Co., "Eighty fifth Annual Report 1940. A Century of Telegraph Progress." 1940, pp. 9 and 22.
Western Union Telegraph Co., "Instructions for Receiving Clerks," Commercial Bulletin No. 37-A, 1929, 3 pages.
Western Union Telegraph Co., "Money Order Message," between 1933 and 1941, 16 pages.
Western Union Telegraph Co., "Money Order Service," Money Order Book: Rules and List of Offices, Apr. 1, 1934, Thirteenth Edition, 6 pages.
Western Union Telegraph Co., "Money Transer Service," Western Union Telegraph Co. Book of Rules and List of Offices, Feb. 1, 1926, Twelfth Edition, 3 pages.
Western Union Telegraph Co., "Money Transfer from C.C. Antoine to Joe H. Ingraham dated Aug. 25, 1873," Aug. 25, 1873, 1 page.
Western Union Telegraph Co., "Money Transfer Service," Money Transfer Service: Book of Rules and List of Offices, Feb. 1, 1920, Tenth Edition, 3 pages.
Western Union Telegraph Co., "Ninety-Second Annual Report: Year 1947," 1947, 2 pages.
Western Union Telegraph Co., "Remittance for Order Sent Via Western Union," 1936, 2 pages.
Western Union Telegraph Co., "The Yellow Blank is Correct for Every Social Need," Western Union Booklet, 1930, 2 pages.
Western Union Telegraph Co., "The Yellow Blank: When, Why, How to use it," 1934, 5 pages.
Western Union Telegraph Co., "Western Union Shopping Order," 1933, 2 pages.
Western Union Telegraph Co., "Western Union 'Teledater'," 1960, pp. 2-31.
Western Union Telegraph Co., "Western Union Telegram," between 1948 and 1964, 1 page.
Winjen. R., "You've Got Money!," Bank Technology News, Jun. 2000, vol. 13, Issue 6, 4 pages.
X.com, "Do More With Your Money," retrieved from www.x.com on Feb. 7, 2000, 5 pages.

* cited by examiner

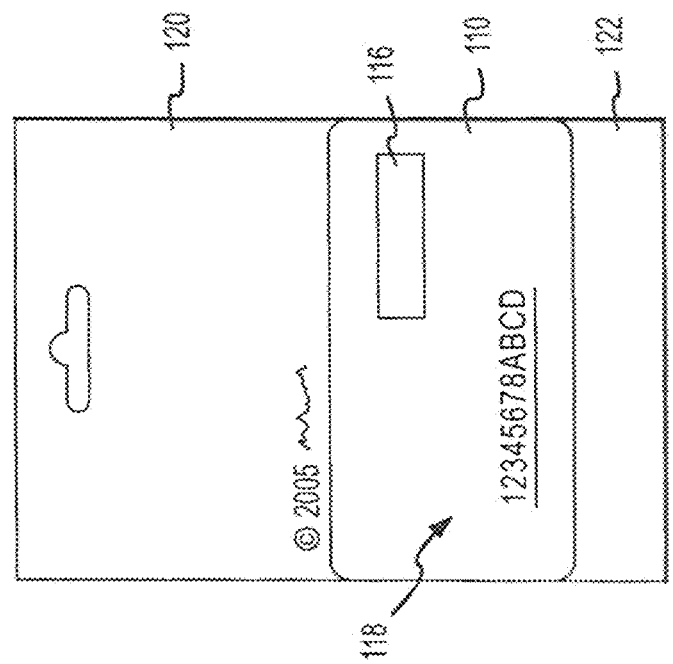
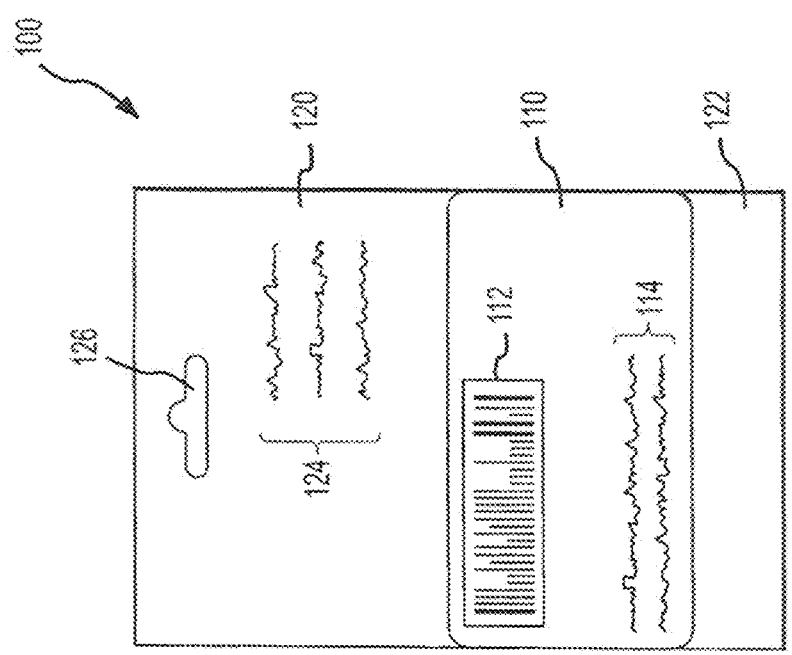

MONEY TRANSFER SYSTEMS AND METHODS

PRIORITY CLAIM

This application is a continuation of U.S. patent application Ser. No. 13/416,826, entitled MONEY TRANSFER SYSTEMS AND METHODS, filed on Mar. 9, 2012, which is a continuation of U.S. patent application Ser. No. 12/638,917, entitled MONEY TRANSFER SYSTEMS AND METHODS, filed on Dec. 15, 2009, which is a continuation-in-part application which claims priority to U.S. patent application Ser. No. 11/132,710, entitled MONEY TRANSFER CARDS, SYSTEMS AND METHODS, filed on May 18, 2005 and U.S. patent application Ser. No. 10/969,767, entitled POINT OF SALE SYSTEMS AND METHODS FOR CONSUMER BILL PAYMENT, filed on Oct. 19, 2004, all of which are incorporated by reference in their entirety for any and all purposes.

BACKGROUND OF THE INVENTION

The present invention relates generally to the field of money transfers, and in particular to money transfer cards, systems and methods to initiate, facilitate, process and/or perform money transfers.

Present money transfer procedures typically involve an individual going to a money transfer location, such as a Western Union location, and giving the customer service agent a variety of personal information. This personal information may include the names and addresses of the sender and recipient, proof of identification, and the amount to be transferred. This information is entered into a money transfer system, and used to create a record of the money transfer. Once the money to be transferred has been collected from the sender, the recipient then proceeds to a separate money transfer location, such as another Western Union location, to pick up the money. The recipient may be required to provide a money transfer number and/or proof of identification, prior to picking up the money. Typically, this procedure is followed for each subsequent money transfer, even when the sender and recipient are the same. As a result, people who frequently send money using money transfer systems are repeatedly providing much of the same information, and making trips to offices or locations designated for money transfers. Further, money transfers typically must be initiated and completed by direct interaction between the customer and the money transfer organization.

Furthermore, consumers require interaction assistance from a service representative at an agent location to send money or make payments. Because of this dependency, consumers may have to wait in a long line behind other consumers that may have similar or even differing customer service needs, before the customer can be helped. Agents, on the other hand, carry a heavy responsibility for being an agent because they have to learn a complex set of services, forms, and computer application to enable the service for their consumers. Agents are typically unfamiliar with money transfer and bill payment services which can reflects poorly on the money transfer brand. Thus, problems with the current system include bottlenecking lines at agent locations and extensive amount of interaction between consumers and agents. Improvements are desired.

BRIEF SUMMARY OF THE INVENTION

The present invention relates generally to the field of money transfers, and in particular to money transfer cards, systems and methods to initiate, facilitate, process and/or perform money transfers. Methods of the present invention will be particularly useful for initiating money transfers "in-lane," such as while shopping at a retail outlet. In this manner, the customer can initiate the money transfer will attending to other shopping or errands, or while at a location not designated solely for money transfers.

In one embodiment of the present invention, a method of facilitating money transfers includes establishing a money transfer record and receiving, from a vendor location, a money transfer activation request associated with the money transfer record. The method includes receiving a fulfillment request associated with the money transfer record, collecting a customer data set, and authorizing a money transfer associated with the money transfer record. The money transfer is facilitated by the creation of a money transfer record, which may occur prior to the money transfer activation request. The customer then can initiate the money transfer while at the vendor location. The money transfer record includes, in some embodiments, a money transfer amount, an account identifier and a code. In this embodiment, receipt of the fulfillment request may include receiving the account identifier and the code from a money transfer customer. The fulfillment request may be received by a customer service representative (CSR), an interactive voice response unit (IVR), a website, or the like.

In one aspect, the method includes associating a money transfer card with the money transfer record, and providing the money transfer card to the vendor location. In another aspect, the receipt of the money transfer activation request includes receiving an account identifier associated with the money transfer record, with the account identifier disposed on the money transfer card. In this manner, a money transfer record may be created, and the money transfer may be initiated or requested using a money transfer card available for purchase at the vendor location. The vendor location, which may include a point-of-sale device and may be a retail outlet, vendor or merchant (e.g., grocery store, gas station, shopping mall, airport, or the like), can be used to facilitate a money transfer between customers.

In some aspects, the activation request includes a money transfer amount and a money transfer fee. The money transfer fee may be a fixed fee (e.g., a set dollar amount per money transfer), or a variable fee (e.g., a percentage of the dollar amount being transferred). The activation request may further include an account identifier, a customer name, and the like. In some embodiments the activation request further includes a payment or payment record. Further, a plurality of money transfer records may be established, with each having an associated money transfer card. The money transfer cards then may be provided to a variety of retail or vendor locations for purchase by customers wanting to transfer money. The collected customer data set typically includes, in some aspects, the name of the money transfer initiator and/or the name of the money transfer recipient. The collected data also may include additional information on one or both parties, including addresses, telephone numbers, cell phone numbers, email addresses, social security numbers, dates of birth, driver license numbers, employee identification numbers, passwords, and the like.

In one aspect, authorizing the money transfer further includes providing a money transfer control number to a first customer associated with the customer data set. The dispensing of the money associated with the money transfer record may occur, for example, upon receipt of the money transfer control number from a second customer associated with the customer data set. In this manner, additional security measures are in place to ensure the correct party receives the transferred money.

In another embodiment of the present invention, a method of facilitating money transfers includes establishing a money transfer record and pairing the money transfer record with a money transfer card. The money transfer record and the money transfer card have an account identifier associated therewith. A money transfer activation request associated with the money transfer record is received, with the activation request including the account identifier. The method includes receiving a money transfer fulfillment request associated with the money transfer record, with the fulfillment request also including the account identifier. In some aspects, the method includes authorizing a money transfer to a money transfer recipient in an amount associated with the money transfer record.

The present invention further provides systems for initiating, processing, facilitating and/or performing money transfers. One such system includes a host computer system having a processor coupled to a database. The host computer system further includes code for performing various methods or method steps of the present invention. In a particular embodiment, the code includes code for establishing a money transfer record, for receiving a money transfer activation request associated with the money transfer record, for receiving a fulfillment request associated with the money transfer record and collecting a customer data set, and for authorizing a money transfer associated with the money transfer record. The host computer may further include code for associating a money transfer card with the money transfer record.

In some aspects, the system includes a point-of-sale device disposed at the vendor location. The point-of-sale device is adapted for receiving the money transfer activation request from the money transfer card and providing the money transfer activation request to the host computer system. In some aspects, the point-of-sale device receives an account identifier associated with the money transfer record from the money transfer card, and initiates the money transfer activation request. Initiation of the money transfer activation request may occur, in some aspects, when the point-of-sale device sends the account identifier to the host. In one aspect, the host computer system includes a first host computer having the code for establishing the money transfer record and a second host computer having the code for authorizing the money transfer associated with the money transfer record. In another aspect, the system includes code for collecting a customer data set and associating the customer data set with the money transfer record.

Other objects, features and advantages of the present invention will become more fully apparent from the following detailed description, the appended claims, and the accompanying drawings.

BRIEF DESCRIPTION OF THE DRAWINGS

FIGS. 1A and 1B are simplified front and rear depictions, respectively, of a money transfer card assembly according to an embodiment the present invention;

DETAILED DESCRIPTION OF THE INVENTION

Figure 2:
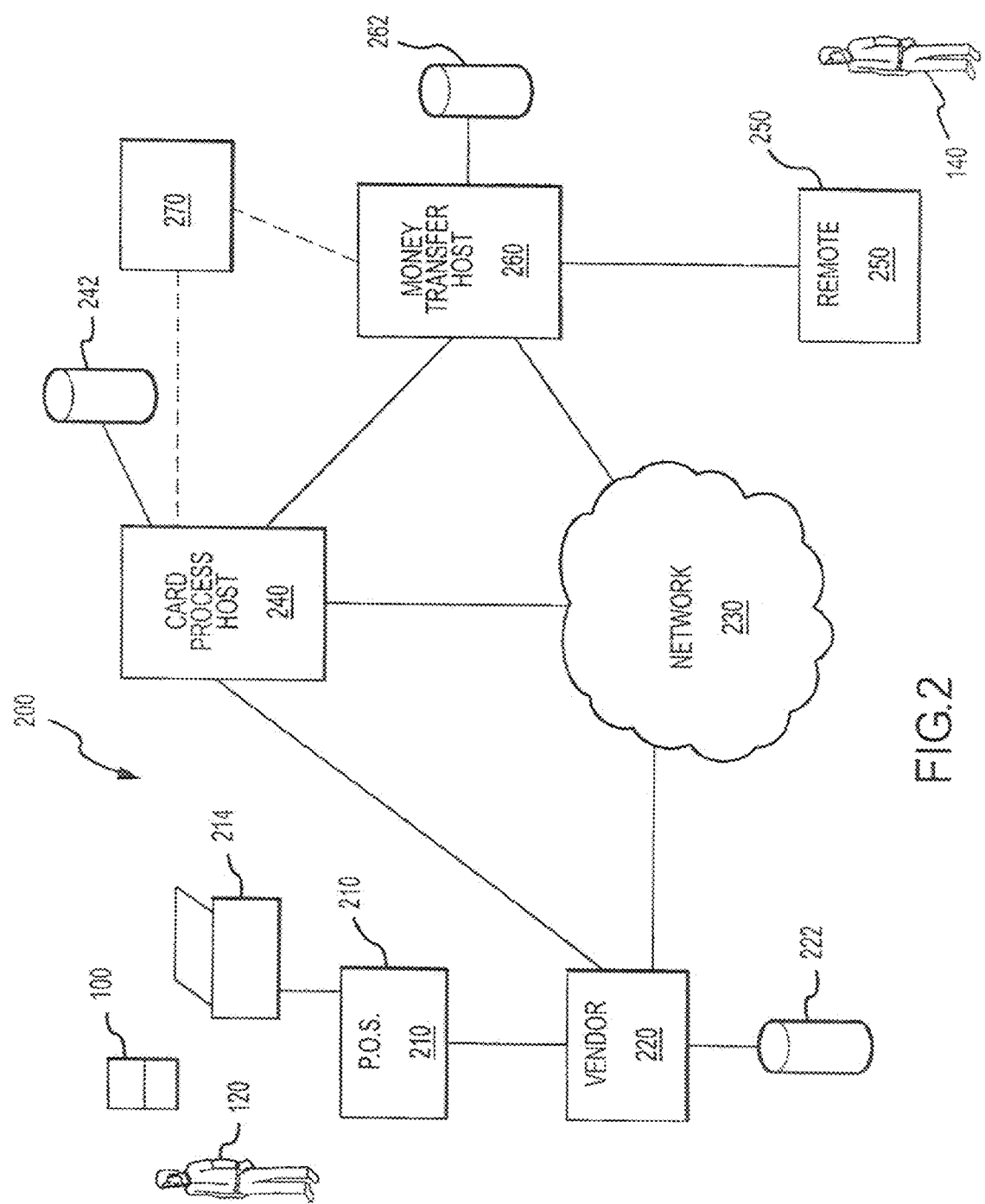
FIG. 2 is a simplified schematic system for facilitating money transfers according to an embodiment of the present invention.

The present invention includes systems and methods that initiate, facilitate, process and/or perform money transfers between customers. The embodiments of the present invention will be particularly useful for customers who want to send money without needing to physically go to a money transfer location, such as a Western Union office. The number of locations at which a money transfer can be initiated are increased through use of the systems and methods of the present invention. Some embodiments result in increased transaction speed and improved convenience to the customers.

FIGS. 1A and 1B depict front and rear views of a money transfer card assembly 100 according to an embodiment of the present invention. Assembly 100 includes a first carrier portion 120 coupled to a money transfer card 110. In one embodiment, carrier portion 120 and money transfer card 110 are coupled along adjoining edges. First carrier portion 120 and money transfer card 110 may be formed from a single sheet of material with a score line separating carrier portion 120 and card 110. In one embodiment, a second carrier portion 122 is coupled to an opposing edge of card 110 as depicted in FIGS. 1A and 1B. It will be appreciated by those skilled in the art that money transfer card 110 may be coupled to carriers in alternative ways within the scope of the present invention. Other means for coupling carrier portion 120 and card 110 are described in U.S. Provisional Patent Application No. 60/638,079, entitled "Transaction Card Assemblies, Systems, and Methods of Making", filed Dec. 20, 2004, assigned to the assignee of the present invention, the complete disclosure of which is incorporated herein by reference. Further, in alternative embodiments of the present invention money transfer cards 110 are displayed and/or sold without a carrier or carrier portion.

First carrier portion 120 includes a space 124 acceptable for writing, images, or the like. In this manner, carrier portion 120 may be used to advertise money transfer card 110 coupled thereto and/or provide information on a money transfer transaction which can be imitated using card 110. Carrier portion 120 may further include a hole 126 disposed therethrough for hanging assembly 100 on a J-hook or other point-of-purchase display. In this manner, money transfer card assemblies 100 may be presented to potential customers near, for example, the checkout of various retail establishments.

As depicted in FIG. 1A, in one embodiment a front surface of money transfer card 110 also includes writing, images, or the like 114. This writing may include, for example, the value of the money transfer associated with card 110, the name of the money transfer organization (e.g., Western Union), a retailer or merchant name, or the like. In one embodiment, an account identifier 112 is disposed on or embossed into the surface of money transfer card 110. In one embodiment, the account identifier 112 is a uniform product code (UPC) that is readable by a point-of-sale device in use by various vendor locations. In this manner, a customer desiring to transfer money in a particular denomination can select an appropriate money transfer card assembly 100 corresponding to that denomination. The customer then presents money transfer card assembly 100 to a point-of-sale device or a clerk operating the point-of-sale device at the vendor location. The point-of-sale device reads account identifier 112 to charge the customer the designated amount for the purchase of money transfer card 110. In one embodiment, the customer is charged an amount associated with money transfer card 110, with that amount including the amount to be transferred and any money transfer fees. In another embodiment, the customer is charged a money transfer amount and a separate money transfer fee associated with the purchase of money transfer card 110. For example, in one embodiment, money transfer card 110 corresponds to a one hundred dollar ($100.00) money transfer, and the purchase of money transfer card assembly 100 costs nine dollars and ninety-five cents ($9.95) to reflect a money transfer fee.

As shown in FIG. 1B, in one embodiment the reverse side of money transfer card 110 includes an account or card identifier 118. In one embodiment, account identifier 118 is a string of alphanumeric characters. In some embodiments, account identifier 118 corresponds to account identifier 112 disposed on the front surface of card 110. In one embodiment, card 110 has only one account identifier 112, 118. Account identifiers 112, 118 may take a number of different forms within the scope of the present invention including, for example, a string of alphanumeric characters, a universal product code (UPC), a magnetic stripe and the like. In this manner, the purchaser of money transfer card assembly 100 has a designated account identifier associated with money transfer card 110 for subsequent fulfillment of the money transfer as further described below. In a particular embodiment, card 110 includes a code 116 disposed on the front or rear surface thereof. Code 116 may take a number of different forms within the scope of the present invention including, for example, a string of alphanumeric characters, a universal product code (UPC), and the like. Code 116 may be similar to a personal identification number, unique to the associated money transfer card 110. In a particular embodiment, code 116 is hidden under a scratch-off surface. In this manner, the customer purchases money transfer card assembly 100 at the vendor location prior to accessing code 116.

A particular advantage of some embodiments is the customer's ability to purchase money transfer card assembly 100 at a variety of vendor locations. Further, in some embodiments the vendor locations need not require special software nor will the clerk operating the point-of-sale device at the vendor location be required to enter detailed information on the card purchaser. In a particular embodiment, the software and hardware necessary to permit the purchase of card assembly 100 corresponds to or is similar to hardware and software adapted for the sale of stored value cards. The money transfer organization, in some embodiments, targets particular neighborhoods, regions, or the like with appropriate card assemblies 100. For example, in a largely Hispanic-speaking neighborhood the money transfer organization places money transfer card assemblies 100 having Spanish as the primary language thereon. In this manner, money transfer card assemblies 100 may be demographically marketed for increased sales. By studying money transfers initiated at the various vendor locations, the money transfer organization also may place money transfer denominations as appropriate. For example, if a particular store generates a large number of high dollar money transfers, a greater number of high denomination money transfer card assemblies 100 can be placed at that store.

Once money transfer card 110 has been purchased, the customer requests the fulfillment of the money transfer by communicating with a money transfer organization associated with card 110, such as Western Union. The money transfer fulfillment can be accomplished a number of ways within the scope of the present invention. For example, a first customer 130 may enter a money transfer location, such as a Western Union location, and provide relevant information to a customer service representative (CSR) for first customer 130 and a second customer 140 who is the intended recipient of the transferred money. In one embodiment, customer 130 requests fulfillment of the money transfer by providing account identifier 118 and/or code 116 to the CSR, IVR and/or money transfer organization website from card 110 previously purchased by customer 130. This may occur, for example, when first customer 130 is the sender of money for transactions between these two customers. The CSR enters the collected information into a computer-based system using appropriate software. In other embodiments, customer information is conveyed by telephone to a CSR or an interactive voice response (IVR) system, by mobile or wireless devices, or the like, in order to provide the fulfillment request for the money transfer.

Alternatively, the fulfillment request may be accomplished when first customer 130 enters customer information into a money transfer organization website, such as a Western Union website. In these embodiments, customer 130 provides the money transfer organization with account identifiers 112, 118, and/or code 116. The money transfer organization website also may prompt first customer 130 to provide further information such as a date of birth, a driver's license number, a password, or the like, to verify the individual's identity. The amount of information retrieved from customers 130 and/or 140 may be effected by the Patriot Act, or other federal, state, or local legislation.

During the fulfillment request process, in one embodiment first customer 130 is provided with a money transfer control identifier or number. The control identifier may take a variety of forms within the scope of the present invention, including being a string of alphanumeric characters. Providing the money transfer control number to first customer 130 may occur through a variety of mechanisms within the scope of the present invention. For example, the control number may be provided to first customer 130 when they request fulfillment of the money transfer associated with money transfer card 110. In another embodiment, money transfer control number is mailed to one or both customers 130, 140 in a fashion similar to the mailing of a personal identification number (PIN) commonly used with automated teller machine (ATM) cards. In another embodiment, the money transfer control number is emailed to customers 130 and/or 140. In still another embodiment, money transfer control number corresponds to code 116. Customer 140 provides the money transfer control number to the money transfer organization, and possibly other proof of identity, prior to receiving the transferred money.

In some embodiments, first customer 130 may determine that the money transfer associated with money transfer card 110 is to be sent to more than one customer, or is to be sent to a single customer in increments. For example, during the fulfillment request process first customer 130 indicates that the money transfer associated with the purchased money transfer card 110 is to be sent to more than one customer. In this embodiment, first customer 130 may receive more than one money transfer control identifier. For example, if the money transfer should be split between two recipients, first customer 130 may receive two money transfer control identifiers, one for each recipient to use when they attempt to receive the transferred funds. Similarly, first customer 130 may wish to send the money to one or more recipients, but have the money transfer be distributed over time. For example, first customer 130 may have purchased a five-hundred dollar ($500.00) money transfer card 110, but wishes to allow the recipient to receive one hundred dollars ($100.00) every week for five weeks. In this embodiment, one or more money transfer control identifiers may be provided to first customer 130 that, when presented by the money transfer recipient, helps indicate to the money transfer organization system that only a portion of the money transfer amount is to be released.

Turning now to FIG. 2, a system 200 for initiating, facilitating, processing and/or performing money transfers according to embodiments of the present invention will be described. System 200 includes a card processing host computer system 240 coupled to a database 242. In one embodiment, card processing host system 240 comprises a server or other computer-based apparatus for creating and maintaining money transfer records associated with money transfer cards 110. Host system 240, in one embodiment, is operated by a third party such as Western Union or another money transfer organization. Database 242 maintains money transfer records, which may include money transfer card identifiers 112, 118, codes 116, and the money transfer amounts.

Card processing host computer system 240 may comprise or be coupled to a server maintaining a Western Union website 270 into which first customer 130 inputs money transfer fulfillment data. Similarly, host computer system 240 may have other user interfaces by which a customer service representative enters money transfer fulfillment information. For example, card processing host computer system 240 may include or be coupled to an interactive voice response system to allow customer 130 to request fulfillment of a money transfer.

System 200 further includes a money transfer host 260 and an associated database 262. Host 260 includes the hardware and software necessary to monitor, authorize, and process money transfers between first customer 130 and second customer 140. As shown in FIG. 2, money transfer host 260 may be coupled to card processing host 240 either directly or through a network 230. Network 230 may include telephone networks, credit card networks, wide area networks, the Internet, wireless networks, and the like. Further, depending on the type of processing device used to transmit the information, such devices may also be coupled to a financial network such as a credit card network or Automated Teller Machine (ATM) network, or may have a direct connection to other host computer systems. Further, money transfer host 260 may be coupled to website 270 or other interface mechanism that allows customer 130 and/or a CSR to interface with money transfer host 260 and card processing host 240.

In one embodiment, in order to receive the money, second customer 140 goes to a remote terminal or system 250. Remote system 250 may be a kiosk, a money transfer location such as a Western Union location, or the like. In one embodiment, remote system 250 also comprises a computer system, associated databases (not shown), and other necessary hardware and software in order to help coordinate the money transfers for customers 130 and 140. In one embodiment, remote computer system 250 is coupled to money transfer host computer system 260 so that database records maintained in database 262 are accessible by remote computer 250. This coupling between remote system 250 and host computer system 260 may be a direct coupling or may be a coupling through network 230 as depicted in FIG. 2.

While host computer systems 240 and 260 are depicted as separate systems, host computer systems 240 and 260 may comprise a single system. Host computer systems 240 and 260 also may have additional components than those depicted including, for example, multiple databases to facilitate the storage and retrieval of money transfer card 110 information and money transfer records associated therewith.

In some embodiments, portions of system 200 are found in retail outlets merchants, vendors, and the like, such as grocery stores, gas stations, shopping malls, airports, and the like. In one embodiment, a retail outlet has an associated vendor system 220 coupled to a database 222. Vendor system 220 also is coupled to a point-of-sale (POS) device or terminal 210. This coupling may be a direct coupling, or may be an electronic coupling through network 230. A direct coupling between vendor system 220 and point-of-sale device 210 may comprise, for example, a point-of-sale terminal 210 in a store location, physically or wirelessly coupled with vendor system 220. In some embodiments, vendor system 220 comprises a server, a computer, or the like, which may be located in a back room of the store or retail location.

Vendor system 220 and its associated database 222 may contain a wide variety of store-related records. For example, in some embodiments database 222 contains inventory lists, price lists, vendor lists, employee information and the like. In a particular embodiment, point-of-sale device 210 exists in a grocery store having a plurality of items available for consumers to purchase. Typically, such a point-of-sale device forms part of a cash register system in which the customer, or a clerk or employee of the store, scans item UPC's or item information into point-of-sale device 210. Point-of-sale device 210 receives the costs associated with those items from vendor system 220. Point-of-sale device 210 then accumulates a total cost of all items to be purchased by first customer 130 and presents the total to customer 130. First customer 130 will then tender payment for the desired items and depart the store location. If the payment is rendered using a credit card, a personal check, or the like, a payment authorization process may occur before the customer departs with the desired items. This authorization may involve standard credit card authorization or check authentication as known to those skilled in the art. Customer 130 also may pay by cash, money order, travelers check, or the like.

In some embodiments, vendor system 220 does not reside at a store location, but instead resides at a regional location. For example, a grocery store chain may have a single regional vendor system 220 maintaining records of store inventory, and costs and prices associated with items sold therein. The point-of-sale terminals 210 in one or more store locations are coupled to vendor system 220. In this manner, inventory and prices can be managed on a regional level in addition to a store by store manner. In still another embodiment, vendor system 220 is a third party owned system used to facilitate various transactions. In some cases, vendor system 220 resides at a third party transaction processing facility.

In some embodiments, point-of-sale terminal(s) 210 communicate with vendor system 220 through network 230. Point-of-sale devices 210 that may be used to capture, transmit and/or receive information to and from host computer system 220 for some embodiments of the present invention are further described in copending U.S. patent application Ser. No. 10/116,689, entitled Systems and Methods for Performing Transactions at a Point-of-Sale, filed Apr. 3, 2002, and assigned to the assignee of the present invention, the complete disclosure of which is herein incorporated by reference.

In some cases first customer 130 purchases items at the store using the above-noted procedure, but also wants to initiate a money transfer to second customer 140. In some embodiments of the present invention, system 200 is adapted to allow first customer 130 to initiate a money transfer at the store location using point-of-sale terminal 210. In a particular embodiment, customer 130 selects a money transfer card assembly 100 and presents the assembly 100 to either point-of-sale terminal 210 or a clerk operating point-of-sale terminal 210. In one embodiment, account identifier 112 and/or 118 is read from card 110 by POS device 210 and sent to card processing host 240. In this manner, host 240 is informed that the money transfer associated with card 110 is being requested. In some embodiments, host 240 returns an authorization to POS device 210 to allow the sale of card 110 to be completed. In other embodiments, the cost of card 110, which in some embodiments includes both the transfer amount and a money transfer fee, are read by POS device 210.

POS device 210, or the clerk operating POS device 210, then collects the money from customer 130 for money transfer card assembly 100. In some embodiments the amount to be charged customer 130 is displayed on card assembly 100. In other embodiments, host system 240 returns a money transfer authorization to POS device 210 which includes the amount to be charged the customer. In some embodiments, the money transfer amount is collected from customer 130, and any money transfer fees are deducted from the collected amount. In other embodiments, POS device 210 is instructed by host system 240 to collect a money transfer fee in addition to the money transfer amount associated with card assembly 100. In some embodiments, the money transfer fee is a variable amount such as a percentage of the money transfer amount. The collection of the fee would be similar to applying a sales tax to an item being purchased at POS device 210. In other embodiments, the money transfer fee is a fixed amount (e.g., five dollars per transfer). Additional money transfer fees may be used in alternative embodiments, such as a sliding fee scale (e.g., a five dollar fee for every one hundred dollars transferred, with a maximum fee of fifty dollars). In some embodiments, vendor system 220 maintains a money transfer fee schedule. The money transfer fee may include a fee to be paid the operator(s) of host system 240, 260, and may include a fee to be paid to the operator of vendor system 220.

In one embodiment, host system 240 and associated database 242 maintains some or all of the money transfer card records. In this embodiment, point-of-sale terminal 210 communicates via network 230 to host computer 240 in order to initiate or facilitate money transfers. In one embodiment, appropriate software is maintained on host computer 240, host computer 260, and/or remote computer 250 or their associated databases 242, 262 to perform the money transfer process. Additional details on some methods according to the present invention will be described in conjunction with FIG. 3.

When customer 130 tenders payment for items purchased at the store and/or for a money transfer, this payment may require further authorization. For example, if customer 130 is paying with a credit card, a standard credit card authorization may be performed using point-of-sale terminal 210. Similarly, if customer 130 is paying with a personal check, a check authentication process may be performed at point-of-sale terminal 210. In some embodiments, customer 130 will be tendering payment only for the money transfer. In other embodiments, customer 130 will be tendering payment for the money transfer and also additional items purchased at the store location operating point-of-sale terminal 210. In this manner, customer 130 may accomplish multiple tasks by, for example, purchasing desired groceries or other items available at a store as well as initiating a money transfer.

In some embodiments, payment received by point-of-sale terminal 210 for money transfers is forwarded to card processing host system 240 or money transfer host system 260 using an Automated Clearing House (ACH) system and process, the Western Union Money Transfer System, or another money transfer system. In some embodiments, host systems 240, 260 control or help control the ACH process for payments received from customer 130 that are associated with money transfers. In this manner, host computers 240, 260 may control the money transfer process so that money collected by point-of-sale terminal 210 is made available to second customer 140 associated with the purchased money transfer card 110. Additional details on money transfers for use with the present invention may be found in U.S. patent application Ser. No. 10/206,661, filed Jul. 26, 2002, entitled Money Transfer Systems and Methods for Travelers, and assigned to the assignee of the present, the complete disclosure of which is herein incorporated by reference.

Figure 3:
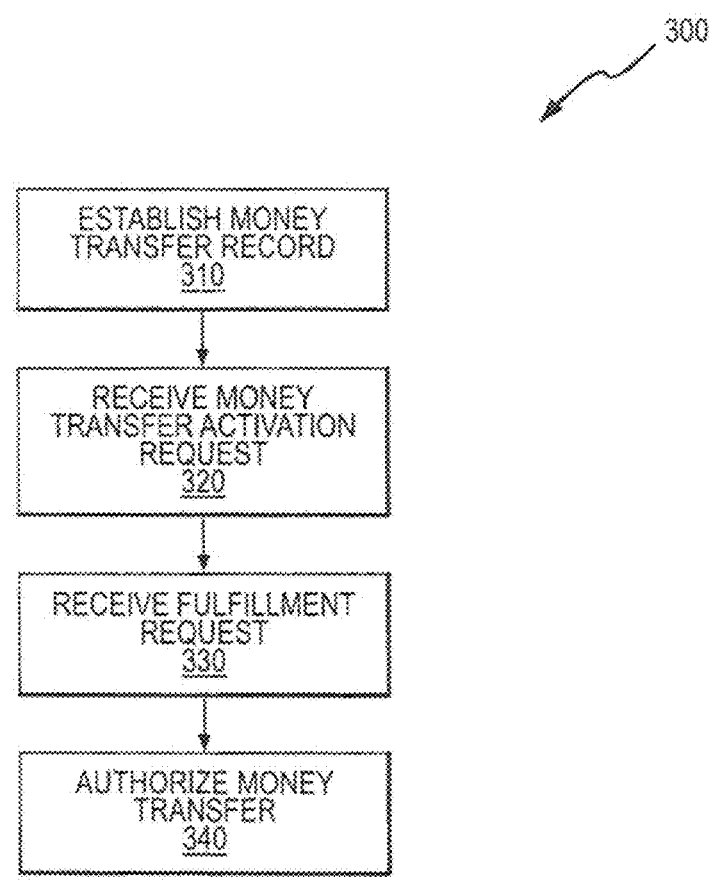
FIG. 3 is a simplified flow diagram of a method according to an embodiment of the present invention.

Turning now to FIG. 3, a method 300 of the present invention will be described. As shown in FIG. 3, method 300 includes establishing a money transfer record (Block 310). This may involve, for example, card processing host system 240 creating a money transfer record and associating the record with a money transfer card 110 for sale at various vendor locations. Method 300 includes receiving a money transfer activation request (Block 320). The receipt of the money transfer activation request may occur according to any of the above described methods. For example, the activation request may be embodied in a UPC or in a magnetic stripe on money transfer card 110 or card assembly 100 that is received by point-of-sale device 210 or a clerk operating point-of-sale device 210. The activation request is sent to host system 240 in one embodiment.

Method 300 optionally includes receiving a payment record. Receipt of the payment record may include point-of-sale device 210 and/or vendor system 220 sending host system 240 and/or system 260 a record that payment has been received from customer 130 for a money transfer associated with money transfer card 110 purchased by customer 130. The payment record may reflect collection of the amount to be transferred and the money transfer fee, if any. In other embodiments, the activation request operates to inform the money transfer organization that the money transfer amount and fees have been collected. In some embodiments, payment is made by first customer 130 during a subsequent fulfillment request.

Method 300 includes receiving a fulfillment request (Block 330). As noted above, the fulfillment request typically will be initiated by customer 130 after purchase of the money transfer card 110. If host systems 240 and/or 260 confirm that all appears in order regarding transfer card 110 and customers 130 and/or 140, method 300 includes authorizing the money transfer (Block 340). The money transfer recipient, customer 140 in this example, then may receive the transferred funds from remote system 250. In some embodiments, system 260 makes the money available to second customer 140 only after a period of time has passed since first customer 130 paid. In this manner, non-cash payments (e.g., checks, credit cards, and other payment methods requiring authorization) made by first customer 130 at the vendor location for the money transfer can be approved or confirmed before dispensing the cash to second customer 140. Further, customer 140 may be required to provide system 250 with the money transfer control number, code 116, account identifier 112, 118, and/or proof of identity. In this manner, desired security controls may be implemented.

Receipt of payment may further include receiving payment of a money transfer fee. In some embodiments, the money transfer fee is deducted from the money transfer amount requested. In other embodiments, customer 130 initiating the transfer pays the amount they desire to transfer to the recipient, and also pays a money transfer fee. Thus, receiving payment may have multiple components. Payment may also include a payment portion for the customer's purchase of various consumer items or services at a retail location operating POS device 210. Database 222 may store a record of the money transfer request being processed. Receipt of the payment record may include receipt of the collected funds, or the receipt of payment records through an ACH or other system.

The fund flow process and interaction between various components of system 200 may occur a number of ways within the scope of the present invention. For example, in one embodiment, customer 130 uses a CSR, IVR, or a website interface 270 to fulfill the transaction. Money transfer host 260 initiates a cash-out on card processing host 240, and then host 260 authorizes payment to customer 140. As previously noted, payment to customer 140 may require that customer 140 provide a money transfer control identifier, personal identification, code 116, or the like.

The advantages of the present invention, including the examples described in conjunction with FIGS. 1-3, are numerous. For the consumer, the consumer now has multiple locations at which they can initiate a money transfer. The consumer may multi-task by sending money from a location at which they had already planned to purchase groceries or the like. Further, the customer need not provide all of the information typically needed for a money transfer to the store clerk, but can interact with experienced money transfer CSRs or systems. As a result, the customer can overcome any language barrier, and receives greater comfort that the money transfer will be effective.

Benefits to the money transfer organization are numerous as well. For example, point-of-sale device 210 can facilitate payment authorization through the credit card authorization and check authentication processes. The money transfer host system will receive payments quickly from the vendor through the ACH or other money transfer processing system. In some embodiments, however, money transfer payments are made in cash, by cashiers check, or other certified funds. The host system operator further benefits by having customers who are satisfied at having additional locations at which a money transfer may be initiated and paid for, but have the information safely and skillfully collected by the host system operator.

Benefits to the vendor operating point-of-sale device 210 also exist. First, the vendor, by participating in this process, is providing an additional service to customers which their competitors may not. This could increase consumer traffic to their store locations. For example, while the above examples describe the user proceeding to a grocery store to purchase items and at the same time initiating a money transfer, the reverse may happen. For example, the customer may proceed to the grocery store to initiate a money transfer, and while they are there purchase a few items. In addition to the possibility of additional purchases, increased revenue may be received by the merchant through commissions paid by the customer and/or the money transfer host. In one embodiment, the vendor receives a small fee from the money transfer organization for each money transfer initiated from the vendor location. Still another advantage to the vendor would be the float available to the vendor. The vendor may have in their account the money associated with the money transfers paid by their customers for a period of time before transmission of the money to host system 240, 260. It will be appreciated by those skilled in the art that additional benefits to each of the parties of the methods of the present invention, arising from one or more components of the systems of the present invention may be realized within the scope of the present invention.

Figure 4:
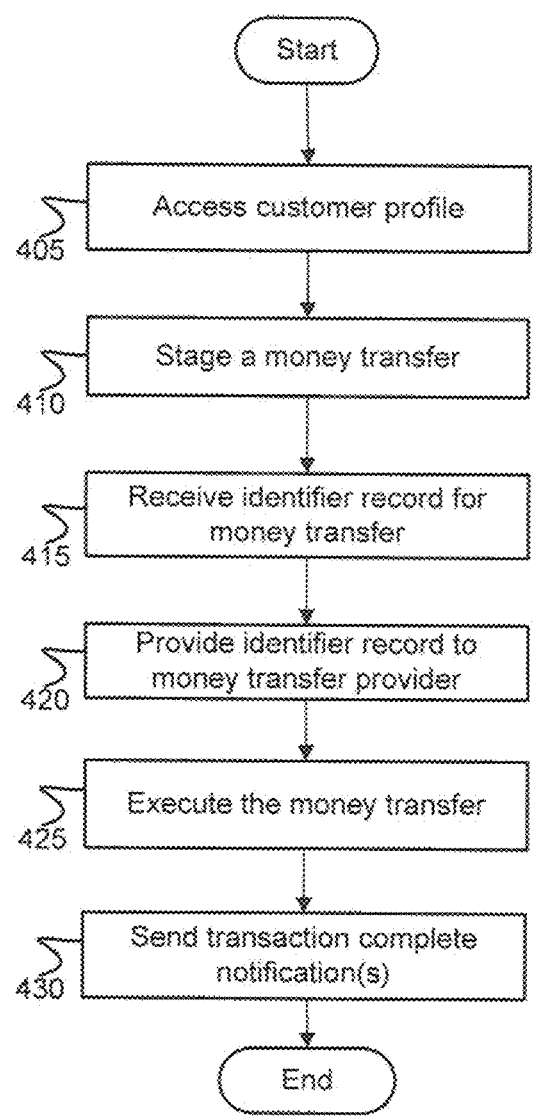
FIG. 4 is a simplified flow diagram of a method according to another embodiment of the present invention.

Turning now to FIG. 4, which illustrates a method 400 of implementing assisted self-service transactions at retail locations. At process block 405, a customer may access their money transfer and/or bill payment account. The account may be an on-line account, a mobile account, etc. The customer may, for example, logon to their money transfer and/or bill payment account at a money transfer and/or bill payment system's website. The customer may provide a username and password combination to access their account. Similarly, the customer may logon to a mobile account using a mobile device and providing username, password, mobile number, etc.

Once the customer has accessed their account, a list of recipients may be displayed which the customer may select from to send a money transfer and/or bill payment. The recipients may include the most recent recipients that the customer has sent money transfers and/or bill payments to, or may be a contacts list, or the like. Furthermore, the customer may also add new recipients. At process block 410, the customer may stage a money transfer and/or bill payment transaction (or multiple money transfer and/or bill payment transactions), a bill payment, etc. The staging process may include selecting a recipient and an amount for the money transfer and/or bill payment. Accordingly, a money transfer and/or bill payment record may be generated as a result of the staging. The record may be stored at the money transfer and/or bill payment system and be associated with the customer account.

In response to the money transfer and/or bill payment being staged, the customer may receive a money transfer and/or bill payment identifier (process block 415). In one embodiment, the money transfer and/or bill payment identifier is a unique barcode which can be printed out, displayed on a mobile device display screen, etc. The barcode may include the recipient, the amount, the customers account number, the identifier, etc. Alternatively, the identifier may be an alphanumeric sequence which uniquely identifies the money transfer and/or bill payment record.

Once the customer has received the identifier, the customer may be required to authenticate the identifier prior to the staged money transfer and/or bill payment being activated and executed. At process block 420, the customer may take the identifier to an agent location, retail store, kiosk, etc. which is associated with the money transfer and/or bill payment system provider. In one embodiment, the customer may take the printout or display of the barcode to an agent location, and the agent (or kiosk) at the agent location may scan the barcode. Alternatively, the customer may access an IVR system or website and provide the identifier to authenticate the identifier and activate the money transfer and/or bill payment. Additionally, the printout may include instructions for the customer regarding the process for completing the staged money transfer and/or bill payment. Furthermore, the barcode may be restricted (or encrypted) to only allow the designated money transfer and/or bill payment system (or its agents) to access the information on the barcode or associated with the identifier.

Accordingly, the authentication of the identifier triggers the money transfer and/or bill payment system to execute (or activate) the money transfer and/or bill payment associated with the identifier (process block 425). Hence, once the money transfer and/or bill payment has been activated, the funds may be transferred (or made available for pickup) to the recipient. Accordingly, the customer is able to seamlessly stage the money transfer and/or bill payment, receive the identifier, scan the identifier, and execute the money transfer and/or bill payment.

Furthermore, at process block 430, a notification may be sent to the customer and/or recipient indicating that the money transfer and/or bill payment has been executed. The notification may be a short message service (SMS) text, an email, a telephone call, a voicemail, etc. Additionally, the staged money transfer and/or bill payment and/or identifier may have a time-to-live provision. For example, if the money transfer and/or bill payment has not been authenticated (or executed) within (two, four, ten, etc.) days of staging, then the identifier and the money transfer and/or bill payment is throttled (or removed) from the money transfer and/or bill payment system.

A number of advantages are realized by the present invention. For example, the customer is able to choose multiple checkout lines to complete the money transfer and/or bill payment—which minimizes wait time, the customer can perform multiple remittances simultaneously—which minimizes wait time and effort, the agents' core competencies are only relied on, and consumers can stage transactions themselves versus calling into an agent to do so. Also, this can be done via kiosk at the agent location or at home.

In a further embodiment, the customer may establish recurring staged payments. As such, the consumer can setup recurring payments, for example, for a mortgage payment, car payment, etc. each week, month, etc. on a specific date for a specific amount. For example, each month on the predetermined date, the system will stage a payment for the consumer and send the customer an email (or txt, etc.) notification with a link to print (or display, etc.) the staged payment invoice (e.g., that has a barcode) to make the payment. Furthermore, reoccurring money transfers may allow be setup (e.g., a monthly transfer for a college student, relative, etc.).

Figure 5:
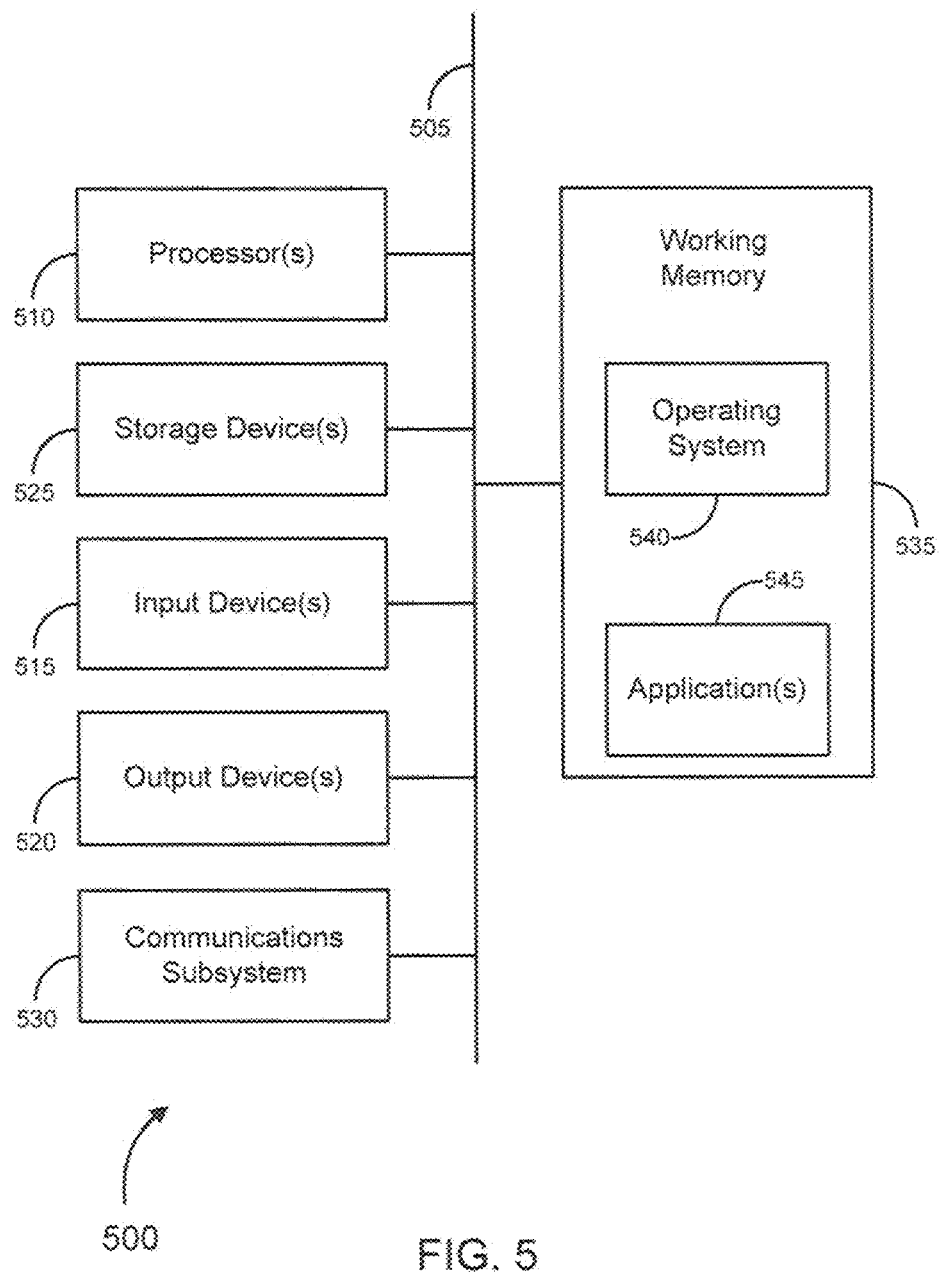
FIG. 5 is a generalized schematic diagram illustrating a computer system, in accordance with various embodiments of the invention.

FIG. 5 provides a schematic illustration of one embodiment of a computer system 500 that can perform the methods of the invention, as described herein, and/or can function as, for example, online invoicing service center 305 (FIG. 3). It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage and/or can include, without limitation, a disk drive, a drive array, an optical storage device, solid-state storage device such as a random access memory ("RAM") and/or a read only memory ("ROM"), which can be programmable, flash-updateable and/or the like. The computer system 500 might also include a communications subsystem 530, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 530 may permit data to be exchanged with a network (such as the network described below, to name one example), and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540 and/or other code, such as one or more application programs 545, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 500) to perform methods of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another machine-readable medium, such as one or more of the storage device(s) 525. Merely by way of example, execution of the sequences of instructions contained in the working memory 535 might cause the processor(s) 510 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 500, various machine-readable media might be involved in providing instructions/code to processor(s) 510 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 525. Volatile media includes, without limitation, dynamic memory, such as the working memory 535. Transmission media includes coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc., carried by the signals) to the working memory 535, from which the processor(s) 510 retrieves and executes the instructions. The instructions received by the working memory 535 may optionally be stored on a storage device 525 either before or after execution by the processor(s) 510.

Figure 6:
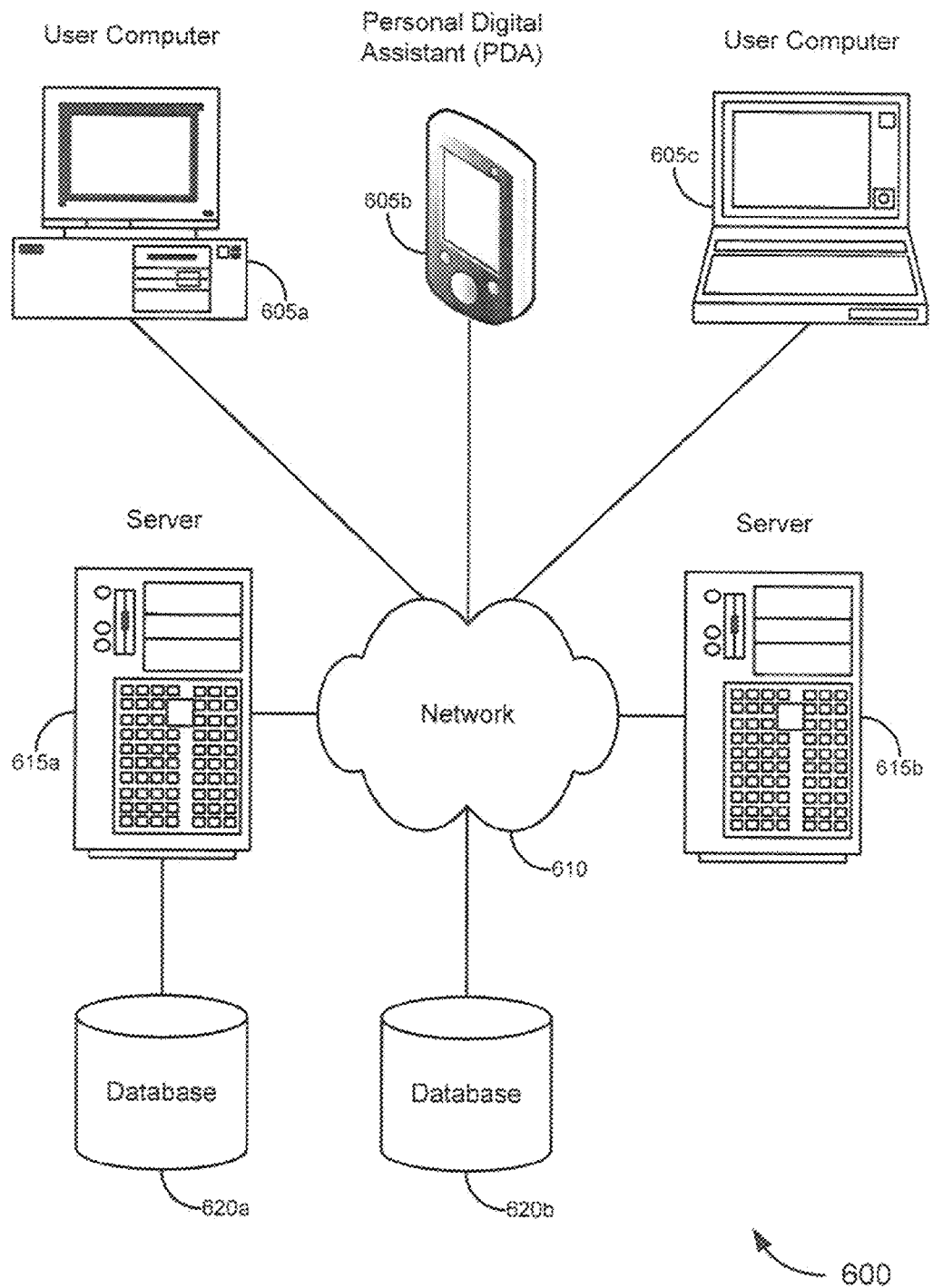
FIG. 6 is a block diagram illustrating a networked system of computers, which can be used in accordance with various embodiments of the invention.

A set of embodiments comprises systems for generating electronic invoices. Merely by way of example, FIG. 6 illustrates a schematic diagram of a system 600 that can be used in accordance with one set of embodiments. The system 600 can include one or more user computers 605. The user computers 605 can be general purpose personal computers (including, merely by way of example, personal computers and/or laptop computers running any appropriate flavor of Microsoft Corp.'s Windows® and/or Apple Corp.'s Macintosh® operating systems) and/or workstation computers running any of a variety of commercially-available UNIX™ or UNIX-like operating systems. These user computers 605 can also have any of a variety of applications, including one or more applications configured to perform methods of the invention, as well as one or more office applications, database client and/or server applications, and web browser applications. Alternatively, the user computers 605 can be any other electronic device, such as a thin-client computer, Internet-enabled mobile telephone, and/or personal digital assistant (PDA), capable of communicating via a network (e.g., the network 610 described below) and/or displaying and navigating web pages or other types of electronic documents. Although the exemplary system 600 is shown with three user computers 605, any number of user computers can be supported.

Certain embodiments of the invention operate in a networked environment, which can include a network 610. The network 610 can be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more servers 615. Each of the servers 615 may be configured with an operating system, including without limitation any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 may be a web server, which can be used, merely by way of example, to process requests for web pages or other electronic documents from user computers 605. The web server can also run a variety of server applications, including HTTP servers, FTP servers, CGI servers, database servers, Java® servers, and the like. In some embodiments of the invention, the web server may be configured to serve web pages that can be operated within a web browser on one or more of the user computers 605 to perform methods of the invention.

The servers 615, in some embodiments, might include one or more application servers, which can include one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including without limitation web applications (which might, in some cases, be configured to perform methods of the invention). Merely by way of example, a web application can be implemented as one or more scripts or programs written in any suitable programming language, such as Java®, C, C#® or C++, and/or any scripting language, such as Perl, Python, or TCL, as well as combinations of any programming/scripting languages. The application server(s) can also include database servers, including without limitation those commercially available from Oracle®, Microsoft®, Sybase®, IBM® and the like, which can process requests from clients (including, depending on the configuration, database clients, API clients, web browsers, etc.) running on a user computer 605 and/or another server 615. In some embodiments, an application server can create web pages dynamically for displaying the information in accordance with embodiments of the invention, such as the information included in the online invoicing service webpage. Data provided by an application server may be formatted as web pages (comprising HTML, Javascript, etc., for example) and/or may be forwarded to a user computer 605 via a web server (as described above, for example). Similarly, a web server might receive web page requests and/or input data from a user computer 605 and/or forward the web page requests and/or input data to an application server. In some cases a web server may be integrated with an application server.

In accordance with further embodiments, one or more servers 615 can function as a file server and/or can include one or more of the files (e.g., application code, data files, etc.) necessary to implement methods of the invention incorporated by an application running on a user computer 605 and/or another server 615. Alternatively, as those skilled in the art will appreciate, a file server can include all necessary files, allowing such an application to be invoked remotely by a user computer 605 and/or server 615. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620. The location of the database(s) 620 is discretionary: merely by way of example, a database 620a might reside on a storage medium local to (and/or resident in) a server 615a (and/or a user computer 605). Alternatively, a database 620b can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle® database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

The invention has now been described in detail. However, it will be appreciated that the invention may be carried out in ways other than those illustrated in the aforesaid discussion, and that certain changes and modifications may be practiced within the scope of the appended claims. Accordingly, the scope of this invention is not intended to be limited by those specific examples, but rather is to be accorded in the scope represented in the following claims.

What is claimed is:

1. A method of facilitating money transfers, the method comprising:
    establishing a transfer record associated with a funds transfer package;
    making the funds transfer package available for sale at a vendor location;
    receiving a transfer activation request including an activation amount of funds to be associated with the funds transfer package;
    receiving a transfer fulfillment request comprising:
        a request to transfer a first portion of the funds to a first receiver;
        a sender's personal identification information; and
        the first receiver's personal identification information;
    in response to the money transfer fulfillment request, providing a transaction identifier to the sender; and
    authorizing payment of the first portion of the funds to the first receiver based on receipt of the transaction identifier from the first receiver.

2. The method of facilitating money transfers as in claim 1, further comprising:
    receiving a second transfer fulfillment request comprising:
        a request to transfer a second portion of the funds to a second receiver; and
        the second receiver's personal identification information;
    in response to the second transfer fulfillment request, providing a second transaction identifier to the sender; and
    authorizing payment of the second portion of the funds to the second receiver based on receipt of the second transfer transaction identifier from the second receiver.

3. The method of facilitating money transfers as in claim 1, wherein receiving the transfer fulfillment request comprises receiving an account identifier associated with the transfer record, the account identifier disposed on the funds transfer package.

4. The method of facilitating money transfers as in claim 1, wherein the funds transfer package denominates an amount of funds associated with the money transfer package.

5. The method of facilitating money transfers as in claim 1, wherein the amounts of funds to be associated with the money transfer package is provided by a purchaser of the funds transfer package.

6. The method of facilitating money transfers as in claim 1, wherein the first portion of funds is equal to the activation amount of funds.

7. The method of facilitating money transfers as in claim 1, wherein the transfer record comprises an account identifier and a code.

8. The method of facilitating money transfers as in claim 7, wherein receiving the transfer fulfillment request comprises receiving the account identifier and the code from the sender.

9. The method of facilitating money transfers as in claim 8, further comprising receiving the transfer fulfillment request via a website.

10. The method of facilitating money transfers as in claim 1, wherein the personal identification information comprises a name of the sender.

11. The method of facilitating money transfers as in claim 1, wherein the personal identification information comprises a name of the first or second receiver.

12. The method of facilitating money transfers as in claim 1, wherein the vendor location comprises a retail outlet.

13. The method of facilitating money transfers as in claim 1, wherein the activation amount of funds corresponds to the amount of funds denominated on the money transfer package.

14. The method of facilitating money transfers as in claim 1, wherein the first receiver and the second receiver are the same.

15. A method of facilitating money transfers, the method comprising:

providing a money transfer package available for sale at a vendor location, the money transfer package including:
    a purchase code readable by a point of sale device at the vendor location for purchase of the money transfer package; and
    a reference code associated with the money transfer package;
receiving a fulfillment request from a first party, the fulfillment request including the following information received from the first party:
    identification information of the first party;
    identification information of a second party; and
    the reference code;
in response to the fulfillment request, providing a transaction identifier to the first party; and
authorizing payment of a money transfer to the second party based on receipt of the transaction identifier from the second party.

16. The method of facilitating money transfers as in claim 15, wherein the purchase code comprises a label or tag.

17. The method of facilitating money transfers as in claim 15, wherein the vendor location comprises a retail outlet.

18. The method of facilitating money transfers as in claim 17, wherein the fulfillment request is received via a website.

19. The method of facilitating money transfers as in claim 15, wherein the transaction number is received from the second party at a money transfer location of a money transfer host.

20. The method of facilitating money transfers as in claim 15, wherein the fulfillment request is received via a phone call.

21. The method of facilitating money transfers as in claim 20, wherein the money transfer transaction identifier is provided to a customer service representative or an interactive voice response (IVR) system.

22. The method of facilitating money transfers as in claim 15, wherein the money transfer package further includes a denomination of an amount of money associated with the money transfer package.

23. The method of facilitating money transfers as in claim 15, wherein the label or tag is a universal product code (UPC).

24. The method of facilitating money transfers as in claim 15, wherein the reference code comprise alphanumeric characters printed on the money transfer package.

25. The method of facilitating money transfers as in claim 24, wherein the alphanumeric code is hidden by a removable portion of the money transfer package.

\* \* \* \* \*